United States Patent
Kung et al.

(10) Patent No.: US 12,052,662 B2
(45) Date of Patent: Jul. 30, 2024

(54) METHOD AND APPARATUS FOR HANDLING LOGICAL CHANNEL PRIORITIZATION REGARDING SIDELINK DISCONTINUOUS RECEPTION IN A WIRELESS COMMUNICATION SYSTEM

(71) Applicant: ASUSTek Computer Inc., Taipei (TW)

(72) Inventors: Yi-Hsuan Kung, Taipei (TW); Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 93 days.

(21) Appl. No.: 17/154,236

(22) Filed: Jan. 21, 2021

(65) Prior Publication Data
US 2021/0227465 A1    Jul. 22, 2021

Related U.S. Application Data

(60) Provisional application No. 62/963,612, filed on Jan. 21, 2020.

(51) Int. Cl.
*H04W 52/02* (2009.01)
*H04W 72/02* (2009.01)
(Continued)

(52) U.S. Cl.
CPC ....... *H04W 52/0216* (2013.01); *H04W 72/02* (2013.01); *H04W 72/0446* (2013.01);
(Continued)

(58) Field of Classification Search
CPC . H04W 52/0216; H04W 76/28; H04W 76/14; H04W 76/27; H04W 72/02;
(Continued)

(56) References Cited

U.S. PATENT DOCUMENTS

2017/0257876 A1* 9/2017 Loehr ............... H04W 28/0278
2018/0199312 A1   7/2018 Wu et al.
(Continued)

FOREIGN PATENT DOCUMENTS

CN    110945959 A    3/2020
EP    3442276 A1    2/2019
(Continued)

OTHER PUBLICATIONS

Corresponding Indian Patent Application No. 202114002846, Office Action dated Aug. 21, 2021. English Translation.
(Continued)

*Primary Examiner* — Xuan Lu
(74) *Attorney, Agent, or Firm* — Cooper Legal Group LLC

(57) ABSTRACT

A method and apparatus are disclosed. In an example from the perspective of a first device, the first device performs sidelink communication with a first set of destinations, wherein one or more devices, associated with a destination of the first set of destinations, discontinuously monitor one or more sidelink control channels and/or one or more sidelink control informations (SCIs). The first device receives a sidelink grant from a network, wherein the sidelink grant is for performing a sidelink transmission at a first timing. The first device selects, from among a second set of destinations, a first destination for the sidelink transmission, wherein each destination of the second set of destinations is determined to have an active time for sidelink containing the first timing.

12 Claims, 11 Drawing Sheets

(51) Int. Cl.
  *H04W 72/0446*  (2023.01)
  *H04W 72/1263*  (2023.01)
  *H04W 72/20*  (2023.01)
  *H04W 72/23*  (2023.01)
  *H04W 72/56*  (2023.01)
  *H04W 72/566*  (2023.01)
  *H04W 76/14*  (2018.01)
  *H04W 76/23*  (2018.01)
  *H04W 76/27*  (2018.01)
  *H04W 76/28*  (2018.01)
  *H04W 92/18*  (2009.01)

(52) U.S. Cl.
  CPC ....... *H04W 72/1263* (2013.01); *H04W 72/20* (2023.01); *H04W 72/23* (2023.01); *H04W 72/566* (2023.01); *H04W 72/569* (2023.01); *H04W 76/14* (2018.02); *H04W 76/27* (2018.02); *H04W 76/28* (2018.02); *H04W 92/18* (2013.01); *H04W 72/56* (2023.01); *H04W 76/23* (2018.02)

(58) Field of Classification Search
  CPC ......... H04W 72/0446; H04W 72/1242; H04W 72/1247; H04W 72/1263; H04W 72/1278; H04W 72/14; H04W 92/18
  USPC .......................................................... 370/311
  See application file for complete search history.

(56) References Cited

U.S. PATENT DOCUMENTS

| | | | | |
|---|---|---|---|---|
| 2021/0045093 A1* | 2/2021 | Rao | ................... | H04W 36/0009 |
| 2021/0059004 A1* | 2/2021 | Wu | ................... | H04W 72/1242 |
| 2022/0201731 A1* | 6/2022 | Lee | .................... | H04W 72/569 |
| 2022/0353815 A1* | 11/2022 | Lin | .................... | H04W 52/0232 |
| 2023/0014303 A1* | 1/2023 | Di Girolamo | ........ | H04W 72/20 |
| 2023/0034294 A1* | 2/2023 | Zhang | ............... | H04W 52/0216 |

FOREIGN PATENT DOCUMENTS

| | | |
|---|---|---|
| EP | 3780891 A1 | 2/2021 |
| JP | 2018509789 A | 4/2018 |
| JP | 2019533962 A | 11/2019 |
| KR | 20170110069 A | 10/2017 |
| WO | 2017078783 A1 | 5/2017 |
| WO | 2018064477 A1 | 4/2018 |
| WO | WO-2018064477 A1 * | 4/2018 |

OTHER PUBLICATIONS

Corresponding European Patent Application No. 21152749.4, Extended European Search Report dated Jun. 18, 2021.

Shrivastava, et al., "Joint Optimization of Energy Efficiency and Scheduling Strategies for Side-Link Relay System", Samsung Electronics, Mar. 19-22, 2017, IEEE Wireless Communications and Networking Conference (WCNC), 2017, pp. 1-6, doi: 10.1109/WCNC.2017.7925661.

"UE procedures related to Sidelink", 3GPP TS 36.213 v16.0.0, Release 16, Dec. 2019.

"Evolved Universal Terrestrial Radio Access (E-UTRA) and Evolved Universal Terrestrial Radio Access Network (E-UTRAN)", 3GPP TS 36.300, Release 16, Version 16.0.0, Dec. 2019, pp. 1-366.

"Medium Access Control (MAC) Protocol Specification", 3GPP TS 38.321, V. 15.8.0, Release 15, pp. 1-78, Dec. 2019.

Corresponding Japanese Patent Application No. 2021-007666, Office Action dated Mar. 1, 2022. English Translation.

Corresponding Korean Application No. 2021-0008781, Office Action dated Nov. 14, 2023, 10 pages.

Corresponding Chinese Patent Application No. 2021-10081825.0, Office Action dated Dec. 1, 2023, 24 pages. English Translation.

Qualcomm Incorporated, ZTE, Samsung: Priority Handling for Sidelink Direct Communication: 3GPP TSG-RAN WG2 Meeting #91Bis, R2-154799, Malmo, Sweden, Oct. 5-9, 2015, 5 pages.

* cited by examiner

METHOD AND APPARATUS FOR HANDLING LOGICAL CHANNEL PRIORITIZATION REGARDING SIDELINK DISCONTINUOUS RECEPTION IN A WIRELESS COMMUNICATION SYSTEM

CROSS-REFERENCE TO RELATED APPLICATIONS

The present Application claims the benefit of U.S. Provisional Patent Application Ser. No. 62/963,612 filed on Jan. 21, 2020, the entire disclosure of which is incorporated herein in its entirety by reference.

FIELD

This disclosure generally relates to wireless communication networks, and more particularly, to a method and apparatus for handling logical channel prioritization regarding sidelink discontinuous reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device, the first device performs sidelink communication with a first set of destinations, wherein one or more devices, associated with a destination of the first set of destinations, discontinuously monitor one or more sidelink control channels and/or one or more sidelink control informations (SCIs). The first device receives a sidelink grant from a network, wherein the sidelink grant is for performing a sidelink transmission at a first timing. The first device selects, from among a second set of destinations, a first destination for the sidelink transmission, wherein each destination of the second set of destinations is determined to have an active time for sidelink containing the first timing.

In an example from the perspective of a first device, the first device performs sidelink communication with a plurality of devices comprising a second device and a third device. The second device is associated with a second destination and the third device is associated with a third destination. The second device discontinuously monitors a second sidelink control channel and/or a second SCI. The third device discontinuously monitors a third sidelink control channel and/or a third SCI. The first device receives a sidelink grant from a network. The sidelink grant is for performing a sidelink transmission at a first timing. The first device has second sidelink data, associated with the second destination, available for transmission. The first device has third sidelink data, associated with the third destination, available for transmission. The first device selects, from among a plurality of destinations comprising the second destination and the third destination, a destination for the sidelink transmission based on whether the second device is determined to be in active time for sidelink at the first timing.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3 rd Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.321 V15.7.0, Medium Access Control (MAC) protocol specification; RP-193257 Work item for sidelink enhancement;

Running CR for 3GPP 38.321 for NR Sidelink. The standards and documents listed above are hereby expressly incorporated by reference in their entirety.

Figure 1:
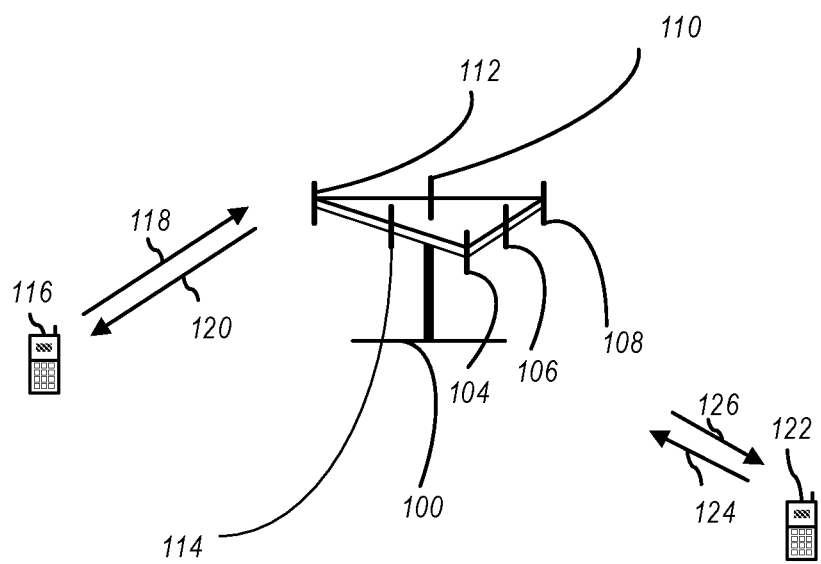
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
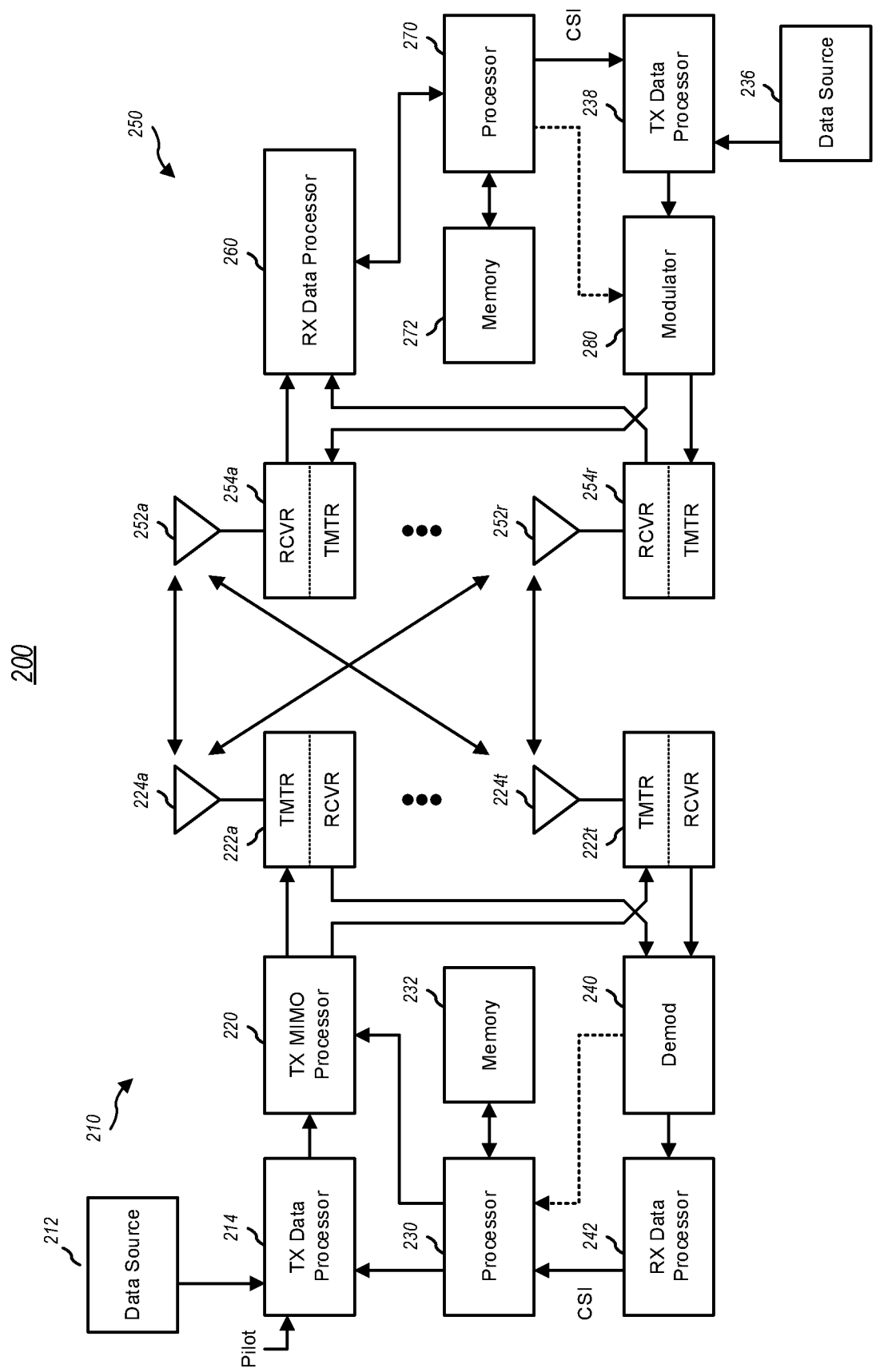
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides N T modulation symbol streams to N T transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. N T modulated signals from transmitters 222a through 222t may then be transmitted from N T antennas 224a through 224t, respectively.

At receiver system 250, the transmitted modulated signals are received by N R antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the N R received symbol streams from N R receivers 254 based on a particular receiver processing technique to provide N T "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
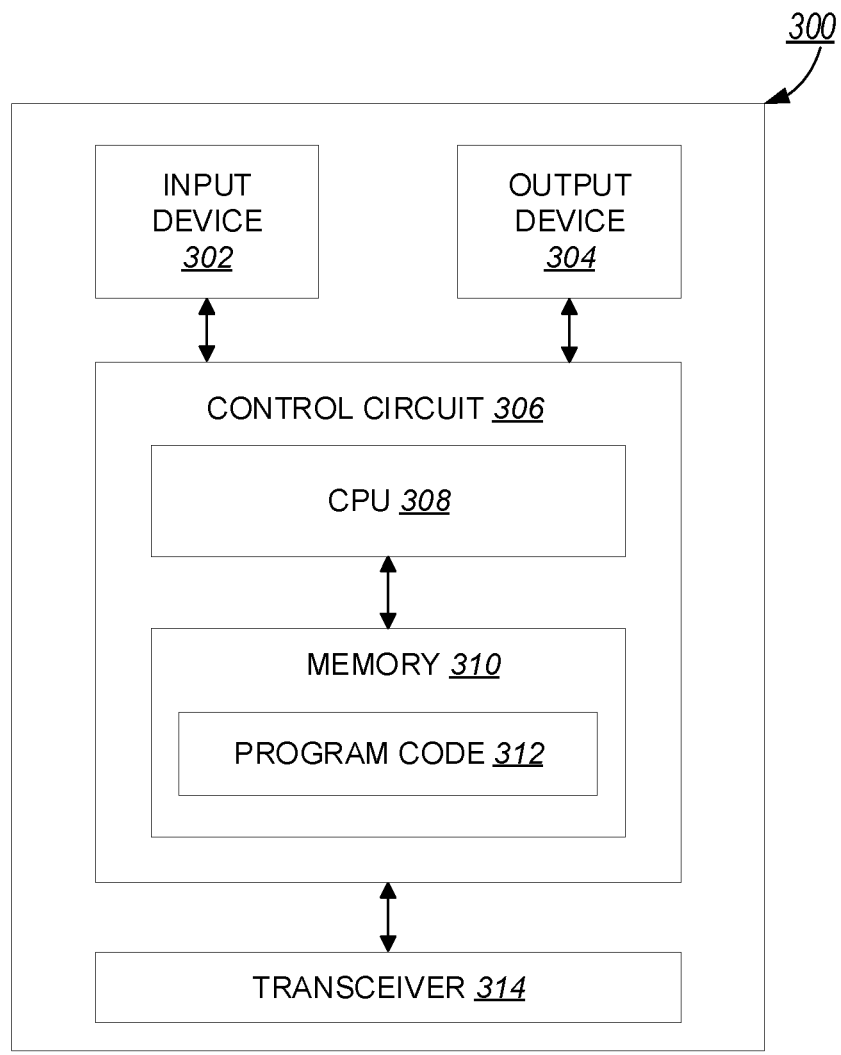
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
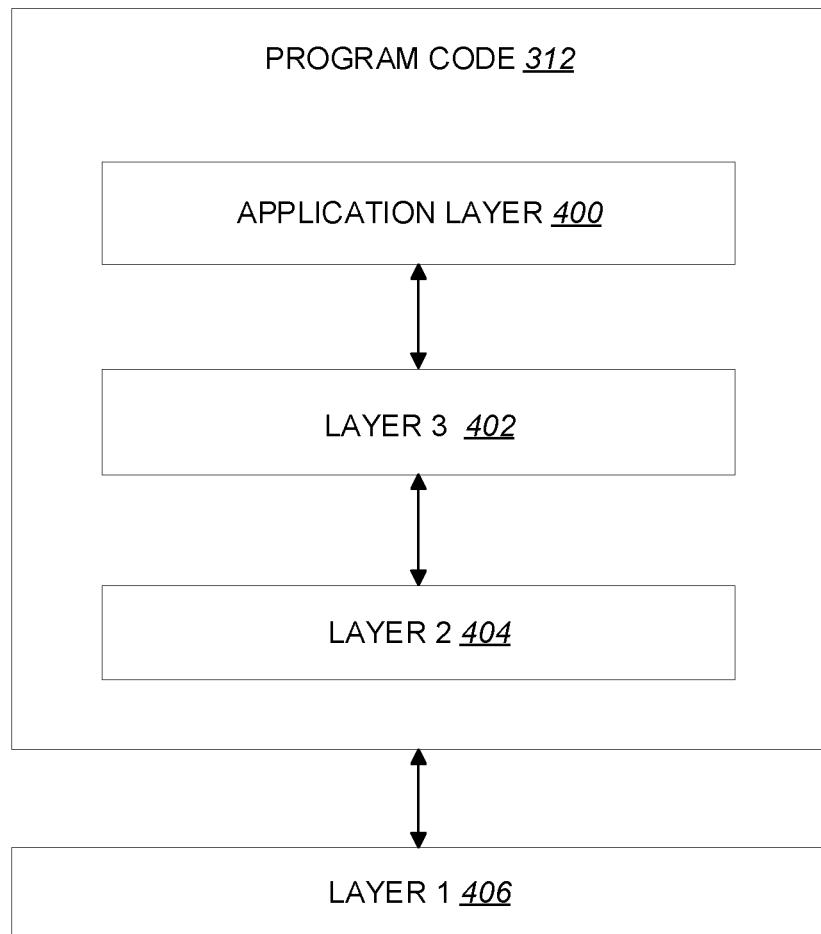
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In 3GPP TS 38.321 V15.7.0, Discontinuous Reception (DRX) is introduced. Some parts of 3GPP TS 38.321 V15.7.0 are quoted below:

5.7 Discontinuous Reception (DRX)

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:
- drx-onDurationTimer: the duration at the beginning of a DRX Cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX Cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity.

When a DRX cycle is configured, the Active Time includes the time while:
- drx-onDurationTimer or drx-InactivityTimer or drx-RetransmissionTimerDL or drx-RetransmissionTimerUL or ra-ContentionResolutionTimer (as described in clause 5.1.5) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

When DRX is configured, the MAC entity shall:
1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
2> stop drx-onDurationTimer;
2> stop drx-InactivityTimer.
1> if drx-InactivityTimer expires or a DRX Command MAC CE is received:
  2> if the Short DRX cycle is configured:
    3> start or restart drx-ShortCycleTimer in the first symbol after the expiry of drx-InactivityTimer or in the first symbol after the end of DRX Command MAC CE reception;
    3> use the Short DRX Cycle.
  2> else:
    3> use the Long DRX cycle.
1> if drx-ShortCycleTimer expires:
  2> use the Long DRX cycle.
1> if a Long DRX Command MAC CE is received:
  2> stop drx-ShortCycleTimer;
  2> use the Long DRX cycle.
1> if the Short DRX Cycle is used, and [(SFN×10)+ subframe number] modulo (drx-ShortCycle)=(drx-StartOffset) modulo (drx-ShortCycle); or 1> if the Long DRX Cycle is used, and [(SFN×10)+ subframe number] modulo (drx-LongCycle)=drx-StartOffset:
 2> start drx-onDurationTimer after drx-SlotOffset from the beginning of the subframe.
1> if the MAC entity is in Active Time:
 2> monitor the PDCCH as specified in TS 38.213 [6];
 2> if the PDCCH indicates a DL transmission:
  3> start the drx-HARQ-RTT-TimerDL for the corresponding HARQ process in the first symbol after the end of the corresponding transmission carrying the DL HARQ feedback;
  3> stop the drx-RetransmissionTimerDL for the corresponding HARQ process.
 2> if the PDCCH indicates a UL transmission:
  3> start the drx-HARQ-RTT-TimerUL for the corresponding HARQ process in the first symbol after the end of the first repetition of the corresponding PUSCH transmission;
  3> stop the drx-RetransmissionTimerUL for the corresponding HARQ process.
 2> if the PDCCH indicates a new transmission (DL or UL):
  3> start or restart drx-InactivityTimer in the first symbol after the end of the PDCCH reception.
1> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
 2> not transmit periodic SRS and semi-persistent SRS defined in TS 38.214 [7];
 2> not report CSI on PUCCH and semi-persistent CSI on PUSCH.
1> if CSI masking (csi-Mask) is setup by upper layers:
 2> in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:
  3> not report CSI on PUCCH.
Regardless of whether the MAC entity is monitoring PDCCH or not, the MAC entity transmits HARQ feedback, aperiodic CSI on PUSCH, and aperiodic SRS defined in TS 38.214 [7] when such is expected.
The MAC entity needs not to monitor the PDCCH if it is not a complete PDCCH occasion (e.g. the Active Time starts or ends in the middle of a PDCCH occasion).

In RP-193257 Work item for sidelink enhancement, DRX for sidelink is introduced. Some parts of RP-193257 Work item for sidelink enhancement are quoted below:
4 Objective
4.1 Objective of SI or Core part WI or Testing part WI
The objective of this work item is to specify radio solutions that can enhance NR sidelink for the V2X, public safety and commercial use cases.
1. Sidelink evaluation methodology update: Define evaluation assumption and performance metric for power saving by reusing TR 36.843 and/or TR 38.840 (to be completed by RAN #88) [RAN1]
 Note: TR 37.885 is reused for the other evaluation assumption and performance metric. Vehicle dropping model B and antenna option 2 shall be a more realistic baseline for highway and urban grid scenarios.
2. Resource allocation enhancement:
 Specify resource allocation to reduce power consumption of the UEs [RAN1, RAN2]
  Baseline is to introduce the principle of Rel-14 LTE sidelink random resource selection and partial sensing to Rel-16 NR sidelink resource allocation mode 2.
  Note: Taking Rel-14 as the baseline does not preclude introducing a new solution to reduce power consumption for the cases where the baseline cannot work properly.
 Study the feasibility and benefit of the enhancement(s) in mode 2 for enhanced reliability and reduced latency in consideration of both PRR and PIR defined in TR37.885 (by RAN #89), and specify the identified solution if deemed feasible and beneficial [RAN1, RAN2]
  Inter-UE coordination with the following until RAN #88.
   A set of resources is determined at UE-A. This set is sent to UE-B in mode 2, and UE-B takes this into account in the resource selection for its own transmission.
  Note: The study scope after RAN #88 is to be decided in RAN #88.
  Note: The solution should be able to operate in-coverage, partial coverage, and out-of-coverage and to address consecutive packet loss in all coverage scenarios.
  Note: RAN2 work will start after RAN #89.
3. Sidelink DRX for broadcast, groupcast, and unicast [RAN2]
 Define on- and off-durations in sidelink and specify the corresponding UE procedure
 Specify mechanism aiming to align sidelink DRX wake-up time among the UEs communicating with each other
 Specify mechanism aiming to align sidelink DRX wake-up time with Uu DRX wake-up time in an in-coverage UE
4. Support of new sidelink frequency bands for single-carrier operations [RAN4]
 Support of new sidelink frequency bands should ensure coexistence between sidelink and Uu interface in the same and adjacent channels in licensed spectrum.
 The exact frequency bands are to be determined based on company input during the WI, considering both licensed and ITS-dedicated spectrum in both FR1 and FR2.
5. Define mechanism to ensure sidelink operation can be confined to a predetermined geographic area(s) for a given frequency range within non-ITS bands [RAN2].
 This applies areas where there is no network coverage.
6. UE Tx and Rx RF requirement for the new features introduced in this WI [RAN4]
7. UE RRM core requirement for the new features introduced in this WI [RAN4]
Enhancements introduced in Rel-17 should be based on the functionalities specified in Rel-16, and Rel-17 sidelink should be able to coexist with Rel-16 sidelink in the same resource pool. This does not preclude the possibility of operating Rel-17 sidelink in a dedicated resource pool.
The solutions should cover both the operating scenario where the carrier(s) is/are dedicated to ITS and the operating scenario where the carrier(s) is/are licensed spectrum and also used for NR Uu/LTE Uu operation.
The solutions should support the network control of NR sidelink as in Rd-16, i.e., NR Uu controls NR sidelink using Layer 1 and Layer 2 signalling and LTE Uu controls NR sidelink using Layer 2 signalling.

In ITS carriers, it is assumed that any co-channel coexistence requirements and mechanisms of NR sidelink with non-3GPP technologies will not be defined by 3GPP.

In Running CR for 3GPP 38.321 for NR Sidelink, NR Vehicle-to-Everything (V2X) is introduced. Some parts of Running CR for 3GPP 38.321 for NR Sidelink are quoted below:

5.x SL-SCH Data Transfer
5.x.1 SL-SCH Data Transmission
5.x.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSSCH duration(s) in which transmission of SCI occurs and a set of PSSCH duration(s) in which transmission of SL-SCH associated with the SCI occurs.

If the MAC entity has a SL-RNTI or SLCS-RNTI, the MAC entity shall for each PDCCH occasion and for each grant received for this PDCCH occasion:
1> if a sidelink grant has been received on the PDCCH for the MAC entity's SL-RNTI:
2> store the sidelink grant as configured sidelink grant;
2> use the received sidelink grant to determine the set of PSCCH durations and the set of PSSCH durations for one or more (re-)transmissions of a single MAC PDU according to [38.2xx];
1> else if a sidelink grant has been received on the PDCCH for the MAC entity's SLCS-RNTI:
2> if PDCCH contents indicate configured grant Type 2 deactivation for a configured sidelink grant:
3> clear the configured sidelink grant, if available;
3> trigger configured sidelink grant confirmation for the configured sidelink grant;
2> else if PDCCH contents indicate configured grant Type 2 activation for a configured sidelink grant:
3> trigger configured sidelink grant confirmation for the configured sidelink grant;
3> store the configured sidelink grant;
3> initialise or re-initialise the configured sidelink grant to determine the set of PSCCH durations and the set of PSSCH durations for transmissions of multiple MAC PDUs according to [xx].

Editor's Note: FFS whether SLCG-RNTI can be used for allocation of retransmission resource in RAM.

If the MAC entity is configured by RRC to transmit using pool(s) of resources in a carrier as indicated in TS 38.331 [5] or TS 36.331 [xy] based on sensing, [or random selection], the MAC entity shall for each Sidelink process:
1> if the MAC entity selects to create a configured sidelink grant corresponding to transmissions of multiple MAC PDUs, and SL data is available in a logical channel:
2> perform the TX resource (re-)selection check as specified in clause 5.x.1.2;
2> if the TX resource (re-)selection is triggered as the result of the TX resource (re-)selection check;
3> randomly select, with equal probability, an integer value in the interval [TBD] for the resource reservation interval in the interval [TBD] and set [SL_RESOURCE_RESELECTION_COUNTER] to the selected value;

Editor's Note: RAN2 assumes that SL_RESOURCE_RESELECTION_COUNTER is specified for Sidelink Mode 2 in 38.321as in 36.321. This assumption needs to be confirmed by RAN1.
3> select the number of HARQ retransmissions from the allowed numbers that are configured by upper layers in [allowedRetxNumberPSSCH] included in [pssch-TxConfigList] and, if configured by upper layers, overlapped in [allowedRetxNumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;
3> select an amount of frequency resources within the range that is configured by upper layers between [minSubchannel-NumberPSSCH] and [maxSubchannel-NumberPSSCH] included in [pssch-TxConfigList] and, if configured by upper layers, overlapped between [minSubchannel-NumberPSSCH] and [maxSubchannel-NumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available];
3> randomly select the time and frequency resources for one transmission opportunity from the resources indicated by the physical layer according to TS 36.2xx [xx], according to the amount of selected frequency resources.
3> use the randomly selected resource to select a set of periodic resources spaced by the resource reservation interval for transmissions of PSCCH and PSSCH corresponding to the number of transmission opportunities of MAC PDUs determined in TS 38.2xx [xx];
3> if one or more HARQ retransmissions are selected:
4> if there are available resources left in the resources indicated by the physical layer according to TS 38.2xx [xx] for more transmission opportunities:
5> randomly select the time and frequency resources for one or more transmission opportunities from the available resources, according to the amount of selected frequency resources and the selected number of HARQ retransmissions;
5> use the randomly selected resource to select a set of periodic resources spaced by the resource reservation interval for transmissions of PSCCH and PSSCH corresponding to the number of retransmission opportunities of the MAC PDUs determined in TS 38.2xx [xx];
5> [consider the first set of transmission opportunities as the new transmission opportunities and the other set of transmission opportunities as the retransmission opportunities;]

Editor's Note: FFS how retransmission opportunities are determined.
5> consider the set of new transmission opportunities and retransmission opportunities as the selected sidelink grant.

3> else:
    4> consider the set as the selected sidelink grant;
3> use the selected sidelink grant to determine the set of PSCCH durations and the set of PSSCH durations according to TS 38.2xx [xx];
3> consider the selected sidelink grant to be a configured sidelink grant.
1> if the MAC entity selects to create a configured sidelink grant corresponding to transmission(s) of a single MAC PDU, and SL data is available in a logical channel:
  2> perform the TX resource (re-)selection check as specified in clause 5.x.1.2;
  2> if the TX resource (re-)selection is triggered as the result of the TX resource (re-)selection check;
    3> select the number of HARQ retransmissions from the allowed numbers that are configured by upper layers in [allowedRetxNumberPSSCH] included in [pssch-TxConfigList] and, if configured by upper layers, overlapped in [allowedRetxNumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;
    3> select an amount of frequency resources within the range that is configured by upper layers between [minSubchannel-NumberPSSCH] and [maxSubchannel-NumberPSSCH] included in [pssch-TxConfigList] and, if configured by upper layers, overlapped between [minSubchannel-NumberPSSCH] and [maxSubchannel-NumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;
    3> randomly select the time and frequency resources for one transmission opportunity from the resources indicated by the physical layer according to TS 38.2xx [xx], according to the amount of selected frequency resources.
    3> if one or more HARQ retransmissions are selected:
      4> if there are available resources left in the resources indicated by the physical layer according to TS 38.2xx [xx] for more transmission opportunities:
        5> randomly select the time and frequency resources for one or more transmission opportunities from the available resources, according to the amount of selected frequency resources and the selected number of HARQ retransmissions;
        5> [consider a transmission opportunity which comes first in time as the new transmission opportunity and a transmission opportunity which comes later in time as the retransmission opportunity];
        5> consider both of the transmission opportunities as the selected sidelink grant;
      3> else:
        4> consider the set as the selected sidelink grant;
      3> use the selected sidelink grant to determine PSCCH duration(s) and PSSCH duration(s) according to TS 38.2xx [xx];
      3> consider the selected sidelink grant to be a configured sidelink grant.

The MAC entity shall for each PSSCH duration:
  1> for each configured sidelink grant occurring in this PSSCH duration:
    2> deliver the sidelink grant to the Sidelink HARQ Entity for this PSSCH duration.

5.x.1.2 TX Resource (Re-)Selection Check
If the TX resource (re-)selection check procedure is triggered for a Sidelink process according to clause 5.x.1.1, the MAC entity shall for the Sidelink process:
  1> if [SL_RESOURCE_RESELECTION_COUNTER=0]; or
Editor's Note: FFS on need of additional condition triggering TX resource (re-)selection.
  1> if a pool of resources is configured or reconfigured by upper layers; or
  1> if there is no configured sidelink grant; or
  1> if the configured sidelink grant cannot accommodate a RLC SDU [by using the maximum allowed MCS configured by upper layers in maxMCS-PSSCH] and the MAC entity selects not to segment the RLC SDU; or
  NOTE: If the configured sidelink grant cannot accommodate the RLC SDU, it is left for UE implementation whether to perform segmentation or sidelink resource reselection.
  1> if transmission(s) with the configured sidelink grant cannot fulfil the latency requirement of the data in a logical channel according to the associated priority, and the MAC entity selects not to perform transmission(s) corresponding to a single MAC PDU; or
  NOTE: If the latency requirement is not met, it is left for UE implementation whether to perform transmission(s) corresponding to single MAC PDU or sidelink resource reselection.
  1> if a sidelink transmission is scheduled by any received SCI indicating a higher priority than the prority of the logical channel and expected to overlap with a resource of the configured sidelink grant, and a measured result on SL-RSRP associated with the sidelink transmission is higher than [threshold]:
    2> clear the configured sidelink grant associated to the Sidelink process, if available;
    2> trigger the TX resource (re-)selection.

5.x.1.3 Sidelink HARQ operation
5.x.1.3.1 Sidelink HARQ Entity
The MAC entity includes at most one Sidelink HARQ entity for transmission on SL-SCH, which maintains a number of parallel Sidelink processes.
The maximum number of transmitting Sidelink processes associated with the Sidelink HARQ Entity is [TBD1]. A sidelink process may be configured for transmissions of multiple MAC PDUs. For transmissions of multiple MAC PDUs, the maximum number of transmitting Sidelink processes associated with the Sidelink HARQ Entity is [TBD2].
Editor's Note: For transmissions of multiple MAC PDUs, TBD2 value is smaller than TBD1 value.
A delivered sidelink grant and its associated HARQ information are associated with a Sidelink process. Each Sidelink process supports one TB.

Editor's Note: FFS on need of specifying how HARQ information is generated, if currently missing in this CR.

For each sidelink grant, the Sidelink HARQ Entity shall:

Editor's Note: FFS whether a sidelink grant is used for initial transmission or retransmission is up to UE implementation for SL mode 2 and dynamic grant in RAN1.

1> if the MAC entity determines that the the sidelink grant is used for initial transmission, and if no MAC PDU has been obtained:

NOTE: For the configured grant Type 1 and 2, whether a sidelink grant is used for initial transmission or retransmission is up to UE implementation.

Editor's Note: RAN1 agreed that UE decides which TB to transmit in each of the occasions indicated by a given configured grant. RAN2 can revisit if the above NOTE is not aligned with the RAN1 agreement.

2> associate a Sidelink process to this grant, and for each associated Sidelink process:
        3> obtain the MAC PDU to transmit from the Multiplexing and assembly entity, if any;
        3> if a MAC PDU to transmit has been obtained:
            4> deliver the MAC PDU, the sideink grant and the HARQ information and the QoS information of the TB to the associated Sidelink process;
            4> instruct the associated Sidelink process to trigger a new transmission;
        3> else:
            4> flush the HARQ buffer of the associated Sidelink process.
    1> else (i.e. retransmission):
        2> identify the Sidelink process associated with this grant, and for each associated Sidelink process:
            3> if a positive acknowledgement to a transmission of the MAC PDU has been received according to clause 5.x.1.3.3; or
            3> if only a negative acknowledgement is configured and no negative acknowledgement is for the the most recent (re-)transmission of the MAC PDU according to clause 5.x.1.3.3:
                4> clear the sidelink grant;
                4> flush the HARQ buffer of the associated Sidelink process;
            3> else:

Editor's Note: FFS on need of checking additional conditions to trigger a HARQ retransmission e.g. based on the maximum number of retransmissions.

4> deliver the sidelink grant and HARQ information and QoS information of the MAC PDU to the associated Sidelink process;
            4> instruct the associated Sidelink process to trigger a retransmission.

5.x.1.3.2 Sidelink Process

The Sidelink process is associated with a HARQ buffer.

New transmissions and retransmissions are performed on the resource indicated in the sidelink grant as specified in clause 5.x.1.1 and with the MCS selected as specified in [clause 5.x.1.1].

If the sidelink process is configured to perform transmissions of multiple MAC PDUs the process maintains [a counter SL_RESOURCE_RESELECTION_COUNTER]. For other configurations of the sidelink process, this counter is not available.

If the Sidelink HARQ Entity requests a new transmission, the Sidelink process shall:

1> consider the NDI to have been toggled for the Sidelink process;
    1> store the MAC PDU in the associated HARQ buffer;
    1> associate the Sidelink process to a HARQ Process ID for the Source Layer-2 ID and Destination Layer-2 ID pair of the MAC PDU for one of unicast, groupcast and [broadcast] which is associated to the pair;
    NOTE: How UE determine HARQ process ID is left to UE implementation for NR sidelink
    1> store the sidelink grant received from the Sidelink HARQ Entity;
    1> generate a transmission as described below;

If the Sidelink HARQ Entity requests a retransmission, the Sidelink process shall:

1> consider the NDI not to have been toggled for the Sidelink process;
    1> generate a transmission as described below;

To generate a transmission, the Sidelink process shall:

1> if there is no uplink transmission; or
    1> if the MAC entity is able to simultaneously perform uplink transmission(s) and sidelink transmission at the time of the transmission; or
    1> if the other MAC entity and the MAC entity are able to simultaneously perform uplink transmission(s) and sidelink transmission at the time of the transmission respectively; or Editor's Note: In the above text, the other MAC entity corresponds to at least E-UTRA MAC entity performing the uplink transmission(s) in (NG)EN-DC. FFS on support of the other cases.

1> if there is a MAC PDU to be transmitted for this duration in uplink, except a MAC PDU obtained from the Msg3 buffer or having logical channel(s) of which the value of the highest priority is lower than [thresUL-TxPrioritization], if configured, and the sidelink transmission is prioritized over uplink transmission:
        2> instruct the physical layer to transmit SCI according to the stored sidelink grant with the associated HARQ information including the values of the NDI and the HARQ Process ID and the associated QoS information including the value of the highest priority of the logical channel(s) in the MAC PDU;
    NOTE: The initial value of the NDI set to the very first transmission for the Sidelink HARQ Entity is left to UE implementation.
        2> instruct the physical layer to generate a transmission according to the stored sidelink grant;
        2> if HARQ feedback is configured for a logical channel from which a MAC SDU is included in the MAC PDU:
            3> instructs the physical layer to monitor PSFCH for the transmission as specified in TS 38.2xx [x].
    1> if this transmission corresponds to the last transmission of the MAC PDU:
        2> decrement [SL_RESOURCE_RESELECTION_COUNTER] by 1, if available.

The transmission of the MAC PDU is prioritized over uplink transmissions of the MAC entity or the other MAC entity if the following conditions are met:

1> if the MAC entity is not able to perform this sidelink transmission simultaneously with all uplink transmissions at the time of the transmission, and
    1> if uplink transmission is not prioritized by upper layer according to TS [24.386] [xx]; and 1> if the value of the highest priority of the logical channel(s) in the MAC PDU is lower than [thresSL-TxPrioritization] if [thresSL-TxPrioritization] is configured.

5.x.1.3.3 PSFCH Reception

The MAC entity shall for each PSSCH transmission:
1> if an acknowledgement corresponding to the transmission in clause 5.x.1.3.2 is obtained from the physical layer:
  2> deliver the acknowledgement to the corresponding Sidelink HARQ entity for the Sidelink process;
1> else:
  2> deliver a negative acknowledgement to the corresponding Sidelink HARQ entity for the Sidelink process;
1> if the MAC entity has a SL-RNTI or SLCS-RNTI and a valid PUCCH resource configured for [sidelink acknowledgement]:
  2> instruct the physical layer to signal the PUCCH according to TS 38.2xx [x].

Editor's Note: FFS whether instructing the L1 to signal the PUCCH is to be specified in 38.321 or RAN1 specification.

5.x.1.4 Multiplexing and Assembly

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

5.x.1.4.1 Logical Channel Prioritization 5.x.1.4.1.1 General

The sidelink Logical Channel Prioritization procedure is applied whenever a new transmission is performed.

RRC controls the scheduling of sidelink data by signalling for each logical channel:
  [sl-priority] where an increasing priority value indicates a lower priority level;
  [sl-prioritisedBitRate] which sets the sidelink Prioritized Bit Rate (sPBR);
  [sl-bucketSizeDuration] which sets the sidelink Bucket Size Duration (sBSD).

RRC additionally controls the LCP procedure by configuring mapping restrictions for each logical channel:
  [configuredSLGrantType1Allowed] which sets whether a configured grant Type 1 can be used for sidelink transmission.

The following UE variable is used for the Logical channel prioritization procedure:
  [SBj] which is maintained for each logical channel j.

The MAC entity shall initialize [SBj] of the logical channel to zero when the logical channel is established.

For each logical channel j, the MAC entity shall:
1> increment [SBj] by the product sPBR×T before every instance of the LCP procedure, where T is the time elapsed since [SBj] was last incremented;
1> if the value of [SBj] is greater than the sidelink bucket size (i.e. sPBR×sBSD):
  2> set [SBj] to the sidelink bucket size.
NOTE: The exact moment(s) when the UE updates [SBj] between LCP procedures is up to UE implementation, as long as [SBj] is up to date at the time when a grant is processed by LCP.

5.x.1.4.1.2 Selection of Logical Channels

The MAC entity shall for each SCI corresponding to a new transmission:
1> select a Destination associated to one of unicast, groupcast and broadcast, having the logical channel with the highest priority, among the logical channels having data available for transmission;
1> select the logical channels for each SL grant that satisfy all the following condition:
  2> [configuredSLGrantType1Allowed], if configured, is set to true in case the SL grant is a Configured Grant Type 1.

5.x.1.4.1.3 Allocation of Sidelink Resources

The MAC entity shall for each SCI corresponding to a new transmission:
1> allocate resources to the logical channels as follows:
  2> logical channels selected in clause 5.x.1.4.1.2 for the SL grant with [SBj]>0 are allocated resources in a decreasing priority order. If the SL-PBR of a logical channel is set to infinity, the MAC entity shall allocate resources for all the data that is available for transmission on the logical channel before meeting the sPBR of the lower priority logical channel(s);
  2> decrement [SBj] by the total size of MAC SDUs served to logical channel j above;
  2> if any resources remain, all the logical channels selected in clause 5.x.1.4.1.2 are served in a strict decreasing priority order (regardless of the value of [SBj]) until either the data for that logical channel or the SL grant is exhausted, whichever comes first. Logical channels configured with equal priority should be served equally.
NOTE: The value of [SBj] can be negative.

The UE shall also follow the rules below during the SL scheduling procedures above:
  the UE should not segment an RLC SDU (or partially transmitted SDU or retransmitted RLC PDU) if the whole SDU (or partially transmitted SDU or retransmitted RLC PDU) fits into the remaining resources of the associated MAC entity;
  if the UE segments an RLC SDU from the logical channel, it shall maximize the size of the segment to fill the grant of the associated MAC entity as much as possible;
  the UE should maximise the transmission of data;
  if the MAC entity is given a sidelink grant size that is equal to or larger than [x] bytes while having data available and allowed (according to clause 5.x.1.4.1) for transmission, the MAC entity shall not transmit only padding;
  [A logical channel with HARQ-enabled and a logical channel with HARQ-disabled cannot be multiplexed into the same MAC PDU.]

Editor's Note: FFS how LCP will take HARQ A/N enabled/disabled into account, e.g. packet with HARQ enabled will be multiplexed only with packets with HARQ enabled.

The MAC entity shall not generate a MAC PDU for the HARQ entity if the following conditions are satisfied:
  the MAC PDU includes zero MAC SDUs.

Logical channels shall be prioritised in accordance with the following order (highest priority listed first):
  data from SCCH;

Editor's Note: FFS on whether different SCCHs have different priorities i.e. for PC5-S and PC5-RRC.
  [FFS on need of MAC CE for SL-CSI/RI];
  data from any STCH.

5.x.1.3.2 Multiplexing of MAC SDUs

The MAC entity shall multiplex MAC SDUs in a MAC PDU according to clauses 5.x.1.3.1 and 6.x.

5.x.1.5 Scheduling Request

In addition to clause 5.4.4, the Scheduling Request (SR) is also used for requesting SL-SCH resources for new transmission. If configured, the MAC entity performs the SR procedure as specified in this clause unless otherwise specified in clause 5.4.4.

The SR configuration of the logical channel that triggered the Sidelink BSR (clause 5.x.1.6) (if such a configuration exists) is also considered as corresponding SR configuration for the triggered SR (clause 5.4.4).

All pending SR(s) triggered according to the Sidelink BSR procedure (clause 5.x.1.6) prior to the MAC PDU assembly shall be cancelled and each respective sr-ProhibitTimer shall be stopped when the MAC PDU is transmitted and this PDU includes a Sidelink BSR MAC CE which contains buffer status up to (and including) the last event that triggered a Sidelink BSR (see clause 5.x.1.4) prior to the MAC PDU assembly. All pending SR(s) triggered for requesting SL-SCH resources shall be cancelled and each respective sr-ProhibitTimer shall be stopped when the SL grant(s) can accommodate all pending data available for transmission in sidelink.

5.x.1.6 Buffer Status Reporting

The Sidelink Buffer Status reporting (SL-BSR) procedure is used to provide the serving gNB with information about SL data volume in the MAC entity.

RRC configures the following parameters to control the SL-BSR:
- periodicBSR-TimerSL;
- retxBSR-TimerSL;
- logicalChannelSR-DelayTimerAppliedSL;
- logicalChannelSR-DelayTimerSL;
- logicalChannelGroupSL.

Each logical channel which belongs to a Destination is allocated to an LCG as specified in TS 38.331 [5] or TS 36.331 [xy]. The maximum number of LCGs is eight.

The MAC entity determines the amount of SL data available for a logical channel according to the data volume calculation procedure in TS s 38.322 [3] and 38.323 [4].

A SL-BSR shall be triggered if any of the following events occur:

1> if the MAC entity has a [SL-RNTI] or [SLCS-RNTI]:
  2> SL data, for a logical channel of a Destination, becomes available to the MAC entity; and either
    3> this SL data belongs to a logical channel with higher priority than the priorities of the logical channels containing available SL data which belong to any LCG belonging to the same Destination; or
    3> none of the logical channels which belong to an LCG belonging to the same Destination contains any available SL data.
  in which case the SL-BSR is referred below to as 'Regular SL-BSR';
  2> UL resources are allocated and number of padding bits remaining after a Padding BSR has been triggered is equal to or larger than the size of the SL-BSR MAC CE plus its subheader, in which case the SL-BSR is referred below to as 'Padding SL-BSR';
  2> retxBSR-TimerSL expires, and at least one of the logical channels which belong to an LCG contains SL data, in which case the SL-BSR is referred below to as 'Regular SL-BSR';
  2> periodicBSR-TimerSL expires, in which case the SL-BSR is referred below to as 'Periodic SL-BSR'.
1> else:
  2> An SL-RNTI is configured by RRC and SL data is available for transmission in the RLC entity or in the PDCP entity, in which case the Sidelink BSR is referred below to as "Regular Sidelink BSR".

For Regular SL-BSR, the MAC entity shall:
  1> if the SL-BSR is triggered for a logical channel for which logicalChannelSR-DelayTimerAppliedSL with value true is configured by upper layers:
    2> start or restart the logicalChannelSR-DelayTimerSL.
  1> else:
    2> if running, stop the logicalChannelSR-DelayTimerSL.

For Regular and Periodic SL-BSR, the MAC entity shall:
  1> if [thresSL-TxPrioritization] is configured and the value of the highest priority of the logical channels that belong to any LCG and contain SL data for any Destination is lower than [thresSL-TxPrioritization]; and
  1> if either [thresUL-TxPrioritization] is not configured or [thresUL-TxPrioritization] is configured and the value of the highest priority of the logical channels that belong to any LCG and contain UL data is equal to or higher than [thresUL-TxPrioritization] according to clause 5.4.5:
    2> prioritize the LCG(s) for the Destination(s).
  1> if the number of bits in the UL grant is expected to be equal to or larger than the size of a SL-BSR containing buffer status for all LCGs having data available for transmission plus its subheader according to clause 5.4.3.1.3:
    2> report SL-BSR containing buffer status for all LCGs having data available for transmission;
  1> else:
    2> if the number of bits in the UL grant is expected to be smaller than the size of a SL-BSR containing buffer status only for all prioritized LCGs having data available for transmission plus its subheader according to clause 5.4.3.1.3:

Editor's Note: The above condition may need to be further improved if it is concluded that the text does not correctly capture the corresponding agreement.

3> report Truncated SL-BSR containing buffer status for as many LCGs having data available for transmission as possible, taking the number of bits in the UL grant into consideration;
      3> prioritize the SL-BSR for logical channel prioritization specified in clause 5.4.3.1;

Editor's Note: FFS on whether the SL-BSR can contain non-prioritized LCG as well as prioritized LCG.
    2> else:
      3> report Truncated SL-BSR containing buffer status for as many LCGs having data available for transmission as possible, taking the number of bits in the UL grant into consideration.

For Padding BSR:
  1> if the number of padding bits remaining after a Padding BSR has been triggered is equal to or larger than the size of a SL-BSR containing buffer status for all LCGs having data available for transmission plus its subheader:
    2> report SL-BSR containing buffer status for all LCGs having data available for transmission;
  1> else:
    2> report Truncated SL-BSR containing buffer status for as many LCGs having data available for transmission as possible, taking the number of bits in the UL grant into consideration.

For SL-BSR triggered by retxBSR-TimerSL expiry, the MAC entity considers that the logical channel that triggered the SL-BSR is the highest priority logical channel that has data available for transmission at the time the SL-BSR is triggered.

The MAC entity shall:
1> if the sidelink Buffer Status reporting procedure determines that at least one SL-BSR has been triggered and not cancelled:
  2> if UL-SCH resources are available for a new transmission and the UL-SCH resources can accommodate the SL-BSR MAC CE plus its subheader as a result of logical channel prioritization according to clause 5.4.3.1:
    3> instruct the Multiplexing and Assembly procedure in clause 5.4.3 to generate the SL-BSR MAC CE(s);
    3> start or restart periodicBSR-TimerSL except when all the generated SL-BSRs are Truncated SL-BSRs;
    3> start or restart retxBSR-TimerSL.
  2> if a Regular SL-BSR has been triggered and logicalChannelSR-DelayTimerSL is not running
    3> if there is no UL-SCH resource available for a new transmission; or
    3> if the MAC entity is configured with configured uplink grant(s):
      4> trigger a Scheduling Request.

NOTE: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one SL-BSR MAC CE, even when multiple events have triggered a SL-BSR. The Regular SL-BSR and the Periodic SL-BSR shall have precedence over the padding SL-BSR.

The MAC entity shall restart retxBSR-TimerSL upon reception of an SL grant for transmission of new data on any SL-SCH.

All triggered SL-BSRs may be cancelled when the SL grant(s) can accommodate all pending data available for transmission. All BSRs triggered prior to MAC PDU assembly shall be cancelled when a MAC PDU is transmitted and this PDU includes a SL-BSR MAC CE which contains buffer status up to (and including) the last event that triggered a SL-BSR prior to the MAC PDU assembly. All triggered SL-BSRs shall be cancelled, and retx-BSR-TimerSL and periodic-BSR-TimerSL shall be stopped, when upper layers configure autonomous resource selection.

NOTE: MAC PDU assembly can happen at any point in time between uplink grant reception and actual transmission of the corresponding MAC PDU. SL-BSR and SR can be triggered after the assembly of a MAC PDU which contains a SL-BSR MAC CE, but before the transmission of this MAC PDU. In addition, SL-BSR and SR can be triggered during MAC PDU assembly.

5.x.2 SL-SCH Data Reception
5.x.2.1 SCI Reception

SCI indicate if there is a transmission on SL-SCH and provide the relevant HARQ information. A SCI consists of two parts: an initial part of the SCI on PSCCH and the remaining part of the SCI on PSSCH as specified in [x].

Editor's Note: FFS on support of a single SCI in RAN1 e.g. for broadcast.

The MAC entity shall:
1> for each PSCCH duration during which the MAC entity monitors PSCCH:
  2> if an initial part of a SCI for this PSSCH duration has been received on the PSCCH:
    3> determine the set of PSSCH durations in which reception of the remaining part of the SCI and the transport block occur using the received part of the SCI;
    3> if the remaining part of the SCI for this PSSCH duration has been received on the PSSCH:
      4> store the SCI as SCI valid for the PSSCH durations corresponding to transmission(s) of the transport block and the associated HARQ information and QoS information;
1> for each PSSCH duration for which the MAC entity has a valid SCI:
  2> deliver the SCI and the associated HARQ information and QoS information to the Sidelink HARQ Entity.

5.x.2.2 Sidelink HARQ operation
5.x.2.2.1 Sidelink HARQ Entity

There is at most one Sidelink HARQ Entity at the MAC entity for reception of the SL-SCH, which maintains a number of parallel Sidelink processes.

Each Sidelink process is associated with SCI in which the MAC entity is interested. This interest is as determined by the Destination Layer-1 ID and the Source Layer-1 ID of the SCI. The Sidelink HARQ Entity directs HARQ information and associated TBs received on the SL-SCH to the corresponding Sidelink processes.

The number of Receiving Sidelink processes associated with the Sidelink HARQ Entity is defined in [TBD].

For each PSSCH duration, the Sidelink HARQ Entity shall:
1> for each SCI valid for this PSSCH duration:
  2> if this PSSCH duration corresponds to new transmission opportunity according to this SCI:
    3> allocate the TB received from the physical layer and the associated HARQ information to an unoccupied Sidelink process, associate the Sidelink process with this SCI and consider this transmission to be a new transmission.
1> for each Sidelink process:
  2> if this PSSCH duration corresponds to retransmission opportunity for the Sidelink process according to its associated SCI:
    3> allocate the TB received from the physical layer and the associated HARQ information to the Sidelink process and consider this transmission to be a retransmission.

5.14.2.2.2 Sidelink Process

For each PSSCH duration where a transmission takes place for the Sidelink process, one TB and the associated HARQ information is received from the Sidelink HARQ Entity.

For each received TB and associated HARQ information, the Sidelink process shall:
1> if this is a new transmission:
  2> attempt to decode the received data.
1> else if this is a retransmission:
  2> if the data for this TB has not yet been successfully decoded:

3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
2> if this is the first successful decoding of the data for this TB and [if the DST field of the decoded MAC PDU subheader is equal to the [x] MSB of any of the Destination Layer-2 ID(s) of the UE for which the [y] LSB are equal to the Destination ID in the corresponding SCI]:

Editor's Note: FFS for details of packet filetering.
3> deliver the decoded MAC PDU to the disassembly and demultiplexing entity;
3> consider the Sidelink process as unoccupied.
1> else:
2> instruct the physical layer to replace the data in the soft buffer for this TB with the data which the MAC entity attempted to decode.
1> if HARQ feedback is configured with [a separate PSFCH resource i.e. option 2] for the Sidelink process; or
1> if HARQ feedback corresponding to this TB is configured with [a shared PSFCH resource i.e. option 1] and the communication range calculated based on the SCI valid for this PSSCH duration according to [TS 38.xxx] is smaller or equal to the requirement indicated in the SCI valid for this PSSCH duration:
2> instruct the physical layer to generate acknowledgement(s) of the data in this TB.

5.14.2.3 Disassembly and Demultiplexing

The MAC entity shall disassemble and demultiplex a MAC PDU as defined in clause 6.x.

In RP-193257 Work item for sidelink enhancement, Discontinuous Reception (DRX) on sidelink is introduced. For a UE to monitor Physical Sidelink Control Channel (PSCCH) (e.g., sidelink control information (SCI)), it is necessary for one or more timing durations associated with monitoring PSCCH (e.g., SCI) to be defined. In NR Uu, a UE may discontinuously monitor Physical Downlink Control Channel (PDCCH) based on a DRX configuration (e.g., a DRX configuration with which the UE is configured). The UE may monitor PDCCH during active time of the UE. The active time may be determined and/or configured by the DRX configuration, for example. The UE may not monitor PDCCH outside of the active time. The active time may include a time during which at least one of: 1) drx-onDurationTimer, drx-InactivityTimer, drx-RetransmissionTimerDL, drx-RetransmissionTimerUL, and/or ra-ContentionResolutionTimer (and/or a different timer associated with the active time) is running; 2) a Scheduling Request is (or was) sent on PUCCH and is pending; or 3) a PDCCH indicating a new transmission addressed to a C-RNTI of a Medium Access Control (MAC) entity has not been received after successful reception of a Random Access Response for a Random Access Preamble not selected by the MAC entity among the contention-based Random Access Preamble.

In NR Uu, the drx-onDurationTimer is configured by a network. The drx-onDurationTimer may be started (and/or restarted) (e.g., the drx-onDurationTimer may start running) based on a Short DRX Cycle configuration or a Long DRX Cycle configuration. The drx-InactivityTimer may be started (and/or restarted) (e.g., the rx-InactivityTimer may start running) if (and/or in response to) the PDCCH indicates a new transmission (e.g., a downlink (DL) transmission and/or an uplink (UL) transmission). The drx-RetransmissionTimerUL may be started (and/or restarted) (e.g., the drx-RetransmissionTimerUL may start running) after (and/or in response to) expiry of a timer, such as drx-HARQ-RTT-TimerUL. The drx-RetransmissionTimerDL may be started (and/or restarted) (e.g., the drx-RetransmissionTimerDL may start running) after (and/or in response to) expiry of a timer, such as drx-HARQ-RTT-TimerDL.

An issue may occur if a transmitter UE (Tx UE) performs a new transmission via sidelink (SL) to a receiver UE (Rx UE). The Tx UE may obtain one or more sidelink resources for the new transmission via a sidelink grant (SL grant) indicated by a base station (such as in network scheduling mode) or via resource selection by the Tx UE (e.g., autonomous resource selection). The Tx UE may select and/or determine a destination associated with a logical channel with a highest priority among logical channels with sidelink data available for transmission. For example, the Tx UE may perform logical channel prioritization to select and/or determine a logical channel with a highest priority among logical channels with sidelink data available for transmission, and the Tx UE may select and/or determine a destination associated with the logical channel (determined to have the highest priority of priorities associated with the logical channels with sidelink data available for transmission). The Tx UE may perform the new transmission to at least one Rx UE associated with the destination (e.g., the Tx UE may perform the new transmission via unicast, groupcast or broadcast). If the Rx UE uses and/or performs sidelink DRX operation, the Rx UE may not be in active time when the Tx UE performs the new transmission (e.g., the new transmission may be performed outside active time of the Rx UE). The Rx UE may experience data loss (e.g., the Rx UE is not able to receive the new transmission due to not being in active time when the new transmission is performed) and the Tx UE may experience resource waste (as a result of the Rx UE not receiving the new transmission performed by the Tx UE, for example).

Figure 5:
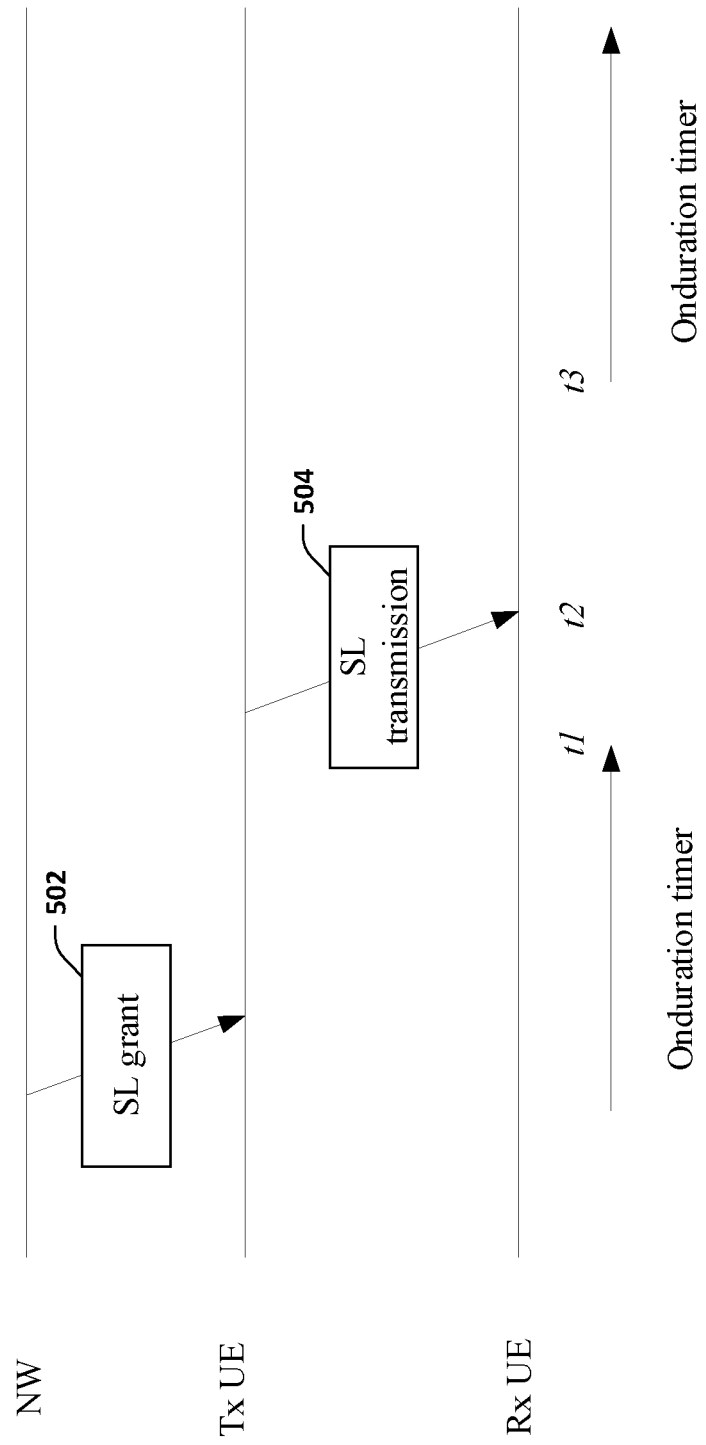
FIG. 5 is a diagram illustrating an exemplary scenario associated with transmission by a transmitter UE (Tx UE) to a receiver UE (Rx UE) that uses and/or performs sidelink Discontinuous Reception (DRX) operation.

FIG. 5 illustrates a timing diagram of an exemplary scenario associated with transmission by a Tx UE to a Rx UE that uses and/or performs sidelink DRX operation. A network (a timeline of which is labeled "NW" in FIG. 5) indicates a sidelink grant 502, associated with a sidelink transmission 504 (e.g., a new sidelink transmission 504), to the Tx UE. For example, the Tx UE may receive the sidelink grant 502 from the network. The sidelink grant 502 schedules, indicates and/or reserves one or more sidelink resources for the Tx UE to perform the sidelink transmission 504. The Tx UE selects a destination (and/or a destination identity (destination ID)) associated with the Rx UE, wherein the destination (and/or the destination identity) is associated with sidelink data, that is available for transmission, with a highest priority (e.g., a highest priority among one or more priorities of one or more sets of sidelink data (associated with one or more destinations) that are available for transmission). The sidelink transmission 504 may be performed by the Tx UE at a timing t2. The Rx UE is configured with a DRX configuration for sidelink. The Rx UE may start an Onduration timer based on a periodicity (and/or cycle). The Rx UE may be in active time when the Onduration timer is running (e.g., an active time of the Rx UE may be a time when the Onduration timer is running). For example, the Rx UE may monitor PSCCH and/or SCI during the active time of the Rx UE (e.g., when the Rx UE is in active time). The Onduration timer expires at a timing t1 (before the timing t2) and the Onduration timer starts (e.g., restarts) at a timing t3 (after the timing t2). For example, the Onduration timer is not running between the timing t1 and the timing t3, and thus, the Rx UE may not be in active time between the timing t1 and the timing t3. Accordingly, the Rx UE may not monitor PSCCH and/or SCI at the timing t2 (since the Rx UE is not in active time at the timing t2). The Rx UE may not receive the sidelink transmission 504 due to not being in active time at the timing t2.

Accordingly, one or more devices and/or techniques are provided herein to solve the above issues (e.g., data loss, such as where a Rx UE is not able to receive a transmission due to not being in active time when the transmission is performed, and/or resource waste as a result of a Rx UE not receiving a transmission performed by a Tx UE, for example). A first concept of the present disclosure is that, for performing a sidelink transmission (e.g., a new sidelink transmission) at a timing, a Tx UE selects a destination associated with the sidelink transmission (and/or determines whether to select a destination associated with the sidelink transmission) based on whether one or more UEs associated with the destination are in active time at the timing.

For example, the Tx UE may select, from among destinations, a destination associated with at least one Rx UE that is in active time at the timing associated with the sidelink transmission (e.g., the timing may be during an active time of the at least one Rx UE). For a SCI and/or for a sidelink grant corresponding to a sidelink transmission, the Tx UE may select a destination, from among destinations associated with Rx UEs that are in active time during a timing of the sidelink transmission, that has a highest priority logical channel with data available for transmission. For example, the destination may be associated with a logical channel that has a highest priority among priorities of logical channels (e.g., each logical channel of the logical channels is associated with at least one Rx UE that is in active time at the timing (e.g., during the timing) of the sidelink transmission) that have data available for transmission. For example, the Tx UE may select and/or determine a set of destinations, wherein each destination of the set of destinations is associated with at least one Rx UE that is in active time at the timing associated with the sidelink transmission. The Tx UE may (after selecting and/or determining the set of destinations, for example) select and/or determine a first logical channel, among logical channels that have sidelink data available for transmission and that are associated with the set of destinations, wherein the first logical channel has a highest priority among priorities of the logical channels. The Tx UE may select and/or determine a first destination associated with the first logical channel (with the highest priority). The Tx UE may perform the sidelink transmission delivering and/or comprising first sidelink data associated with the first logical channel (with the highest priority). For example, the first sidelink data may comprise sidelink data from the first logical channel (and/or the first sidelink data may comprise other data in addition to the sidelink data from the first logical channel). Accordingly, the Tx UE may not select a destination for sidelink transmission if the destination is not in active time (e.g., a Rx UE associated with the destination is not in active time at the timing of the sidelink transmission) even if the destination is associated with a highest priority logical channel among logical channels with data available for transmission.

The sidelink transmission may be associated with a sidelink (SL) resource. The sidelink resource may be indicated by a base station via a sidelink grant. For example, the base station may transmit an indication of the sidelink resource to the Tx UE. Alternatively and/or additionally, the sidelink resource may be selected by the Tx UE. Alternatively and/or additionally, the sidelink resource may be selected by the Tx UE based on one or more sensing results associated with one or more sidelink resources. Alternatively and/or additionally, the sidelink resource may be a first (e.g., initial) sidelink resource in time domain among one or more sidelink resources indicated by the sidelink grant.

The sidelink transmission may comprise a transmission of a sidelink control information (SCI). The sidelink transmission may comprise a sidelink data transmission (e.g., transmission of a Transport Block (TB)). The sidelink transmission may comprise new sidelink data (e.g., sidelink data, available for transmission, that was not already transmitted by the Tx UE since the sidelink data became available for transmission). The sidelink transmission may not correspond to a retransmission (e.g., the sidelink transmission may be a new transmission and/or may not comprise a sidelink retransmission of a transmission). Alternatively and/or additionally, the sidelink transmission may comprise a sidelink retransmission.

The sidelink transmission may be performed at the timing. The timing may be indicated in the SCI. The timing may be indicated by a base station to the Tx UE. The timing may be indicated by the sidelink grant. The timing may be indicated and/or derived based on a reception time of the sidelink grant and/or a time gap indicated by the sidelink grant (e.g., the Tx UE may perform one or more operations (e.g., mathematical operations) using the reception time and the time gap to determine the timing of the sidelink transmission).

A destination for the sidelink transmission is selected based on a determination that the destination meets a condition that one or more UEs associated with the destination are in active time at the timing of the sidelink transmission. For example, the UE may select a destination for the sidelink transmission based on a determination that one or more UEs associated with the destination are in active time at the timing. Alternatively and/or additionally, the UE may not select a destination for the sidelink transmission if one or more UEs (and/or all UEs) associated with the destination are not in active time at the timing.

Figure 6:
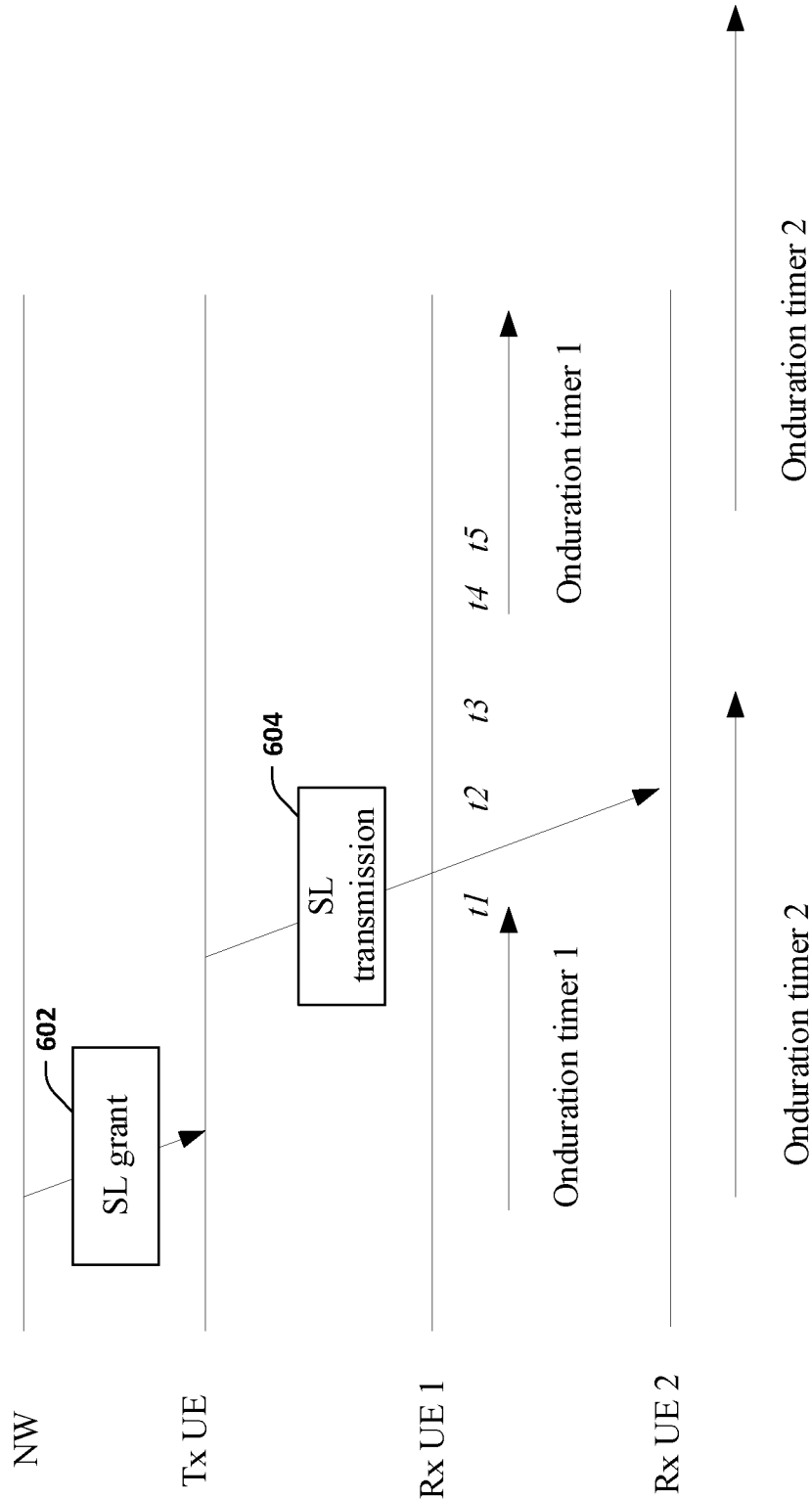
FIG. 6 is a diagram illustrating an exemplary scenario associated with transmission by a Tx UE to a Rx UE that uses and/or performs sidelink DRX operation according to one exemplary embodiment.

FIG. 6 illustrates a timing diagram of an exemplary scenario associated with transmission by the Tx UE to a Rx UE that uses and/or performs sidelink DRX operation. The Tx UE may perform sidelink (SL) communication with a Rx UE 1 and a Rx UE 2 (e.g., a unicast and/or a groupcast link of the Tx UE to the Rx UE 1 and the Rx UE 2 may be established, respectively). The Rx UE 1 may be associated with a destination identity 1 (destination ID 1) and the Rx UE 2 may be associated with a destination identity 2 (destination ID 2). The Tx UE receives a sidelink grant 602 from a network (a timeline of which is labeled "NW" in FIG. 6). The sidelink grant 602 is indicative of a first sidelink transmission opportunity at timing t2. The Rx UE 1 and the Rx UE 2 are configured with different DRX configurations. In some examples, the Tx UE may select a destination identity based on DRX configurations of Rx UEs (e.g., the Rx UE 1, the Rx UE 2 and/or one or more other UEs) with which the Tx UE performs sidelink communication. The Rx UE 1 is not in active time at the timing t2. For example, the Rx UE 1 may not be in active time at the timing t2 due to an Onduration timer of the Rx UE 1 (labeled "Onduration timer 1" in FIG. 6), associated with a DRX configuration of the Rx UE 1, not running at the timing t2 (e.g., the Onduration timer 1 may stop running at timing t1 prior to the timing t2 and/or may start (e.g., restart) running at a timing t4 after the timing t2). The Rx UE 2 is in active time at the timing t2. For example, the Rx UE 2 may be in active time at the timing t2 due to an Onduration timer of the Rx UE 2 (labeled "Onduration timer 2" in FIG. 6), associated with a DRX configuration of the Rx UE 2, running at the timing t2 (e.g., the Onduration timer 2 may stop running at timing t3 after the timing t2). The Tx UE does not select the destination identity 1 (associated with the Rx UE 1) for the sidelink grant 602 and/or for the first sidelink transmission opportunity at the timing t2 indicated by the sidelink grant 602 (e.g., the destination identity 1 may not be selected when performing logical channel prioritization). For example, the Tx UE may not select the destination identity 1 based on a determination that the Rx UE 1 is not in active time at the timing t2. The Tx UE may select the destination identity 2 (associated with the Rx UE 2) for the sidelink grant 602 and/or for the first sidelink transmission opportunity at the timing t2 indicated by the sidelink grant 602. For example, the Tx UE may select the destination identity 2 for performing a sidelink transmission 604 (e.g., a SCI transmission and/or a sidelink data transmission) on the first sidelink transmission opportunity indicated by the sidelink grant 602. Accordingly, in response to selecting the destination identity 2 (associated with the Rx UE 2), the Tx UE may perform the sidelink transmission 604 to the Rx UE 2 (at the timing t2 during which the Rx UE 2 is in active time). In a scenario in which one or more logical channels associated with the Rx UE 1 have sidelink data (available for transmission) with a priority higher than a priority of sidelink data (available for transmission) associated with the Rx UE 2, the Tx UE may select the destination identity 2 for performing the sidelink transmission 604 at the timing t2 (even though the priority of the sidelink data associated with the Rx UE 2 is lower than the priority of the sidelink data associated with the Rx UE 1), such as based on DRX configurations associated with the Rx UE 1 and/or the Rx UE 2 (and/or based on other information in addition to the DRX configurations associated with the Rx UE 1 and/or the Rx UE 2). In some examples, the sidelink grant 602 may indicate a second sidelink transmission opportunity at timing t5 (in addition to the first sidelink transmission opportunity at the timing t2), wherein the Rx UE 1 is in active time and the Rx UE 2 is not in active time at the timing t5. In some examples, in response to receiving the sidelink grant 602, the Tx UE may select a destination (e.g., one destination) based on the timing t2 (e.g., the first sidelink transmission opportunity indicated by the sidelink grant 602) rather than the timing t5 (e.g., the second sidelink transmission opportunity indicated by the sidelink grant 602). The Tx UE consider that the timing t5 is to be used for retransmission of a transmission (e.g., the sidelink transmission 604) performed on the timing t2. In some examples, the timing t5 may be the same as the timing t4 (at which the Onduration timer 1 associated with the Rx UE 1 starts and/or restarts). Alternatively and/or additionally, the timing t5 may be different than (e.g., after) the timing t4.

Figure 7:
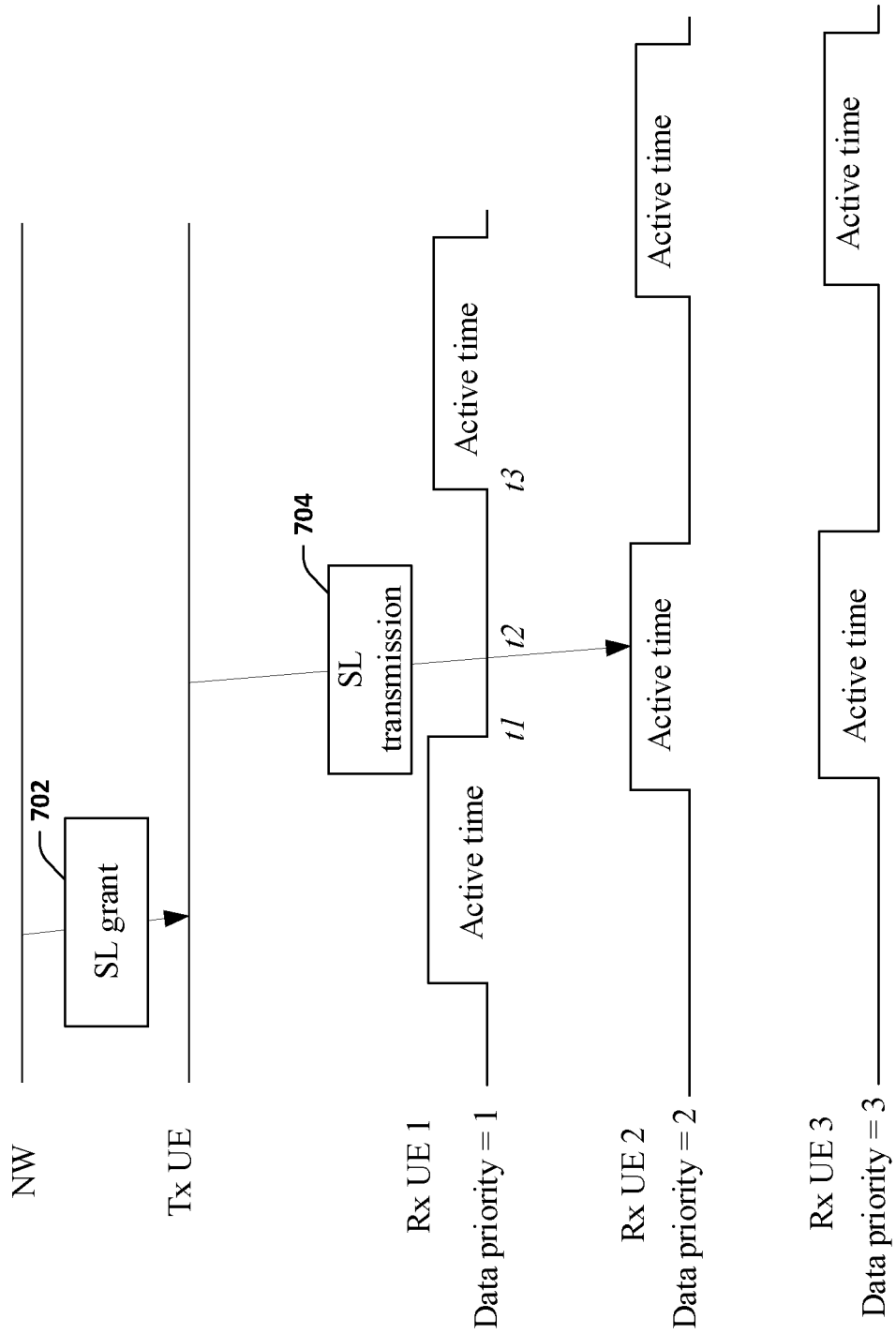
FIG. 7 is a diagram illustrating an exemplary scenario associated with transmission by a Tx UE to a Rx UE that uses and/or performs sidelink DRX operation according to one exemplary embodiment.

FIG. 7 illustrates a timing diagram of an exemplary scenario associated with transmission by the Tx UE to a Rx UE that uses and/or performs sidelink DRX operation. In the exemplary scenario of FIG. 7, the Tx UE may perform sidelink communication with three Rx UEs (Rx UE 1, Rx UE 2, and Rx UE 3). The Tx UE may establish a PC5 link for each Rx UE of the three Rx UEs (e.g., the Tx UE may establish a different PC5 link for each Rx UE of the three Rx UEs). Each Rx UE of the three Rx UEs may be associated with a destination (e.g., each Rx UE of the three Rx UEs may be associated with a different destination). The Rx UE 1 may be associated with a destination identity 1 (destination ID 1). The Rx UE 2 may be associated with a destination identity 2 (destination ID 2). The Rx UE 3 may be associated with a destination identity 3 (destination ID 3). The Tx UE has first data (e.g., sidelink data) available for transmission to the Rx UE 1. The Tx UE has second data (e.g., sidelink data) available for transmission to the Rx UE 2. The Tx UE has third data (e.g., sidelink data) available for transmission to the Rx UE 3. The first data is associated with a first priority value (e.g., Data priority=1). The second data is associated with a second priority value (e.g., Data priority=2). The third data is associated with a third priority value (e.g., Data priority=3). The first data has a highest priority among priorities associated with the first data, the second data and the third data (e.g., Data priority=1 is prioritized over Data priority=2 and Data priority=3). A priority of the second data is higher than a priority of the third data. The three Rx UEs use and/or perform sidelink DRX operation. For example, the three Rx UEs are configured with and/or operate using (e.g., in accordance with) DRX patterns.

The Tx UE receives a sidelink grant 702 from a network (a timeline of which is labeled "NW" in FIG. 7). The sidelink grant 702 is indicative of a first sidelink transmission opportunity at a timing t2. The Rx UE 1 and the Rx UE 2 are configured with different DRX configurations. In some examples, the Tx UE may select a destination identity from the destination identity 1 (associated with the Rx UE 1), the destination identity 2 (associated with the Rx UE 2) and the destination identity 3 (associated with the Rx UE 3) based on DRX configurations (e.g., DRX patterns) of the three Rx UEs and based on priorities (e.g., the first priority value, the second priority value and/or the third priority value) associated with data available for transmission to the three Rx UEs. In some examples, selection of a destination identity may correspond to a selection of a destination associated with the destination identity. For example, the destination identity 1 may be associated with a first destination associated with the Rx UE 1 (e.g., the destination identity 1 may identify the first destination), the destination identity 2 may be associated with a second destination associated with the Rx UE 2 (e.g., the destination identity 2 may identify the second destination) and/or the destination identity 3 may be associated with a third destination associated with the Rx UE 3 (e.g., the destination identity 3 may identify the third destination). In some examples, the Rx UE 2 and the Rx UE 3 are in active time at the timing t2 (e.g., the timing t2 is within active time of the Rx UE 2 and the Rx UE 3). The Rx UE 1 is not in active time at timing t2 (e.g., the timing t2 is outside of active time of the Rx UE 1). In some examples, the Tx UE selects a destination identity for performing a sidelink transmission 704 (on the first sidelink transmission opportunity and/or at the timing t2, for example) among a set of destination identities, such as the destination identity 2 and/or the destination identity 3, associated with Rx UEs (e.g., the Rx UE 2 and the Rx UE 3) that are in active time at the timing t2. The Tx UE does not select a destination identity (e.g., the destination identity 1) associated with a Rx UE (e.g., the Rx UE 1) that is not in active time at the timing t2 (e.g., even though the Rx UE 1 is associated with data having a highest priority among data associated with the three Rx UEs, the destination identity 1 may not be selected for performing the sidelink transmission 704 because the timing t2 of the sidelink transmission 704 is outside active time of the Rx UE 1). The Tx UE selects, from among the set of destination identities (e.g., the destination identity 2 and/or the destination identity 3), the destination identity 2 for performing the sidelink transmission 704 (on the first sidelink transmission opportunity and/or at the timing t2, for example) based on the second data associated with the destination identity 2 having a highest priority among data associated with the set of destination identities (e.g., the second priority value associated with the destination identity 2 is lower than the third priority value associated with the destination identity 3). In an example, the selection of the destination identity 2 (associated with the Rx UE 2) for performing the sidelink transmission 704 corresponds to a selection of the second destination (associated with the Rx UE 2) for performing the sidelink transmission. Accordingly, the Tx UE may perform the sidelink transmission 704, comprising at least some of the second data, to the Rx UE 2 (based on the selection of the destination identity 2 and/or the second destination for the sidelink transmission 704).

A second concept of the present disclosure is that a base station may schedule a sidelink transmission by a Tx UE that takes place when at least one Rx UE (with which the Tx UE performs sidelink communication, for example) is in active time. The base station may schedule the sidelink transmission based on one or more DRX configurations associated with one or more Rx UEs performing sidelink communication with the Tx UE (and/or based on other information in addition to the one or more DRX configurations). The one or more DRX configurations associated with the one or more Rx UEs may be provided by the Tx UE. In some examples, the Tx UE may determine the one or more DRX configurations (such as based on information received from the one or more Rx UEs). In some examples, a DRX configuration of the one or more DRX configurations (and/or each DRX configuration of the one or more DRX configurations) may be associated with a destination (e.g., one destination), a Rx UE (e.g., one Rx UE) for a unicast link and/or a sidelink group (e.g., one sidelink group comprising multiple UEs). In some examples, a DRX configuration of the one or more DRX configurations (and/or each DRX configuration of the one or more DRX configurations) may be associated with more than one Rx UEs in a group (e.g., a sidelink group) for groupcast sidelink transmission. In some examples, the Tx UE may indicate a DRX configuration of a Rx UE (and/or the one or more DRX configurations of the one or more Rx UEs) to the base station (and/or a different base station). For example, the Tx UE may transmit one or more messages, indicative of the one or more DRX configurations, to the base station. The base station may determine the one or more DRX configurations based on the one or more messages. Alternatively and/or additionally, one or more other devices (e.g., the one or more Rx UEs) may transmit one or more second messages, indicative of the one or more DRX configurations, to the base station (and/or the base station may determine the one or more DRX configurations based on the one or more second messages).

In some examples, the base station may not schedule a sidelink transmission (e.g., a sidelink transmission by the Tx UE) that is associated with a timing at which no RX UE of the one or more Rx UEs is in active time (e.g., the base station may not schedule a sidelink transmission that is outside active time of every Rx UE of the one or more Rx UEs). Alternatively and/or additionally, the base station may not be configured (and/or allowed) to schedule a sidelink transmission (e.g., a sidelink transmission, for a new transmission of a TB, by the Tx UE) that is associated with a timing at which no RX UE of the one or more Rx UEs is in active time (e.g., the base station may not be configured to schedule a sidelink transmission that is outside active time of every Rx UE of the one or more Rx UEs). Alternatively and/or additionally, the base station may be prohibited from and/or may prevent scheduling a sidelink transmission (e.g., a sidelink transmission, for a new transmission of a TB, by the Tx UE) that is associated with a timing at which no RX UE of the one or more Rx UEs is in active time (e.g., the base station may be prohibited from scheduling a sidelink transmission that is outside active time of every Rx UE of the one or more Rx UEs).

In some examples, the Tx UE may report a sidelink buffer status to the base station. The sidelink buffer status may indicate an amount of available sidelink data associated with one or more destinations, the one or more Rx UEs and/or one or more sidelink groups. The base station knows (and/or determines) the one or more DRX configurations associated with the one or more destinations, the one or more Rx UEs and/or the one or more sidelink groups (such as based on the one or more messages from the Tx device and/or the one or more second messages from the one or more other devices). The base station can schedule, based on the one or more DRX configurations, a sidelink transmission that is associated with a timing at which at least one destination of the one or more destinations, at least one Rx UE of the one or more Rx UEs and/or at least one sidelink group of the one or more sidelink groups is in active time. In one embodiment, the sidelink buffer status may indicate a first amount of available sidelink data associated with a first destination/Rx UE/sidelink group (e.g., a first destination of the one or more destinations, a first Rx UE of the one or more Rx UEs, and/or a first sidelink group of the one or more sidelink groups) and the sidelink buffer status may indicate a second amount of available sidelink data associated with a second destination/Rx UE/sidelink group (e.g., a second destination of the one or more destinations, a second Rx UE of the one or more Rx UEs and/or a second sidelink group of the one or more sidelink groups). The base station may schedule a sidelink transmission that is associated with a timing at which at least one of the first destination/Rx UE/sidelink group or the second destination/Rx UE/sidelink group is in active time, based on the one or more DRX configurations (e.g., the one or more DRX configurations may comprise a first DRX configuration associated with the first destination/Rx UE/sidelink group and/or a second DRX configuration associated with the second destination/Rx UE/sidelink group). If the sidelink buffer status does not indicate an amount of available sidelink data associated with a third destination/Rx UE/sidelink group (e.g., a third destination of the one or more destinations, a third Rx UE of the one or more Rx UEs and/or a third sidelink group of the one or more sidelink groups), the base station may schedule the sidelink transmission without considering an active time and/or DRX configuration associated with the third destination/Rx UE/sidelink group (e.g., due to the sidelink buffer status not indicating the amount of available sidelink data associated with the third destination/Rx UE/sidelink group, the timing of the sidelink transmission may be not be scheduled based on the active time and/or DRX configuration of the third destination/Rx UE/sidelink group).

Alternatively and/or additionally, the base station may schedule a sidelink transmission that is associated with a timing at which no RX UE of the one or more Rx UEs is in active time. The base station may schedule the sidelink transmission and/or a first sidelink resource (e.g., a first sidelink resource for use to perform the sidelink transmission) based on a minimum duration of time. For example, the base station may schedule the sidelink transmission and/or the first sidelink resource such that a duration of time between a first timing when the Tx UE receives a sidelink grant (e.g., the timing may correspond to a time at which the Tx UE receives the sidelink grant scheduling the sidelink transmission and/or a slot in which the Tx UE receives the sidelink grant) and a second timing of the first sidelink resource and/or the sidelink transmission is greater than or equal to the minimum duration of time. Alternatively and/or additionally, the base station may schedule a second sidelink resource such that a duration of time between the first timing and a third timing of the second sidelink resource is greater than or equal to the minimum duration of time. The minimum duration of time may be based on a duration of time required for the Tx UE to indicate to a Rx UE to wake up (e.g., enter wake up mode, enter active time, continue being in wake up mode and/or continue being in active time) and/or a duration of time required for the Tx UE to perform processing associated with transmitting the sidelink transmission. In an example, the Tx UE may transmit a signal to one or more Rx UEs to instruct (and/or indicate to) the one or more Rx UEs to wake up (e.g., enter wake up mode, enter active time, continue being in wake up mode and/or continue being in active time) before the second sidelink resource (scheduled by the sidelink grant, for example). For example, the signal may instruct (and/or indicate to) the one or more Rx UEs to monitor the second sidelink resource. In an example, the second sidelink resource may be after the first sidelink resource scheduled by the sidelink grant (e.g., the first sidelink resource may be an initial sidelink resource indicated by the sidelink grant and/or the second sidelink resource may follow the first sidelink resource). Alternatively and/or additionally, the Tx UE may transmit a signal to maintain a sidelink chain (e.g., a PC5 link) to link with the second sidelink resource and/or a third sidelink resource indicated by the sidelink grant (e.g., the third sidelink resource may follow the second sidelink resource). In some examples, the first sidelink resource indicated by the sidelink grant may be used for transmitting the signal. Alternatively and/or additionally, the Tx UE may transmit a signal to instruct (and/or indicate to) the one or more Rx UEs to wake up (e.g., enter wake up mode, enter active time, continue being in wake up mode and/or continue being in active time) before (and/or during) the first sidelink resource (e.g., the signal may instruct (and/or indicate to) the one or more Rx UEs to wake up for monitoring one or more sidelink resources scheduled by the sidelink grant). Timing associated with transmission of the signal (by the Tx UE, for example) and/or monitoring of the signal (by a Rx UE, for example) may be configured (e.g., pre-configured) and/or may not be limited by sidelink DRX procedure. For example, the Tx UE may be configured with a configuration associated with transmitting the signal and/or a Rx UE may be configured with a configuration associated with monitoring the signal.

With respect to one or more embodiments herein, such as one or more techniques, devices, concepts, methods and/or alternatives described above, one or more Rx UEs may be associated with one or more destination identities, such as one or more V2X destination identities.

With respect to one or more embodiments herein, the Tx UE may perform sidelink unicast communication with the one or more Rx UEs.

With respect to one or more embodiments herein, the Tx UE may perform sidelink groupcast communication with the one or more Rx UEs.

With respect to one or more embodiments herein, the Tx UE may perform sidelink broadcast communication with the one or more Rx UEs.

With respect to one or more embodiments herein, the logical channel (and/or each of the logical channels) may be associated with a destination identity.

With respect to one or more embodiments herein, a sidelink grant may indicate one or more sidelink resources amounting to at most a maximum number of sidelink resources. The one or more sidelink resources may be for transmission of a TB. In some examples, a sidelink resource of the one or more sidelink resources may be for a new transmission (e.g., a new transmission of the TB). For example, the new transmission may correspond to an initial transmission of the TB (following data of the TB becoming available for transmission). In some examples, a sidelink resource of the one or more sidelink resources may be for retransmission (e.g., retransmission, such as blind retransmission, of the TB). In some examples, the new transmission precedes the retransmission (and thus, the sidelink resource for the new transmission may precede the sidelink resource for the retransmission). For example, the sidelink resource for the new transmission may be an initial sidelink resource, in time domain, of the one or more sidelink resources indicated by the sidelink grant.

In an example, the maximum number of sidelink resources may be three sidelink resources. In an example in which a sidelink grant indicates three sidelink resources (e.g., a first sidelink resource, a second sidelink resource following the first sidelink resource and a third sidelink resource following the second sidelink resource), one of the three sidelink resources may be for a new transmission (e.g., a new transmission of the TB) and/or two of the three sidelink resources may be for retransmissions (e.g., retransmissions, such as blind retransmissions, of the TB). For example, the first sidelink resource (e.g., an initial sidelink resource, in time domain, of the three sidelink resources) may be for the new transmission. The second sidelink resource and/or the third sidelink resource may be for the retransmissions.

With respect to one or more embodiments herein, if the Tx UE determines (and/or considers and/or derives) that no Rx UE with DRX configuration is in wake up mode and/or in active time at a timing of the first sidelink resource (e.g., the initial sidelink resource) among the one or more sidelink resources of the sidelink grant, the Tx UE may not transmit on the first sidelink resource. Alternatively and/or additionally, if the Tx UE determines (and/or considers and/or derives) that no Rx UE with DRX configuration is in wake up mode and/or in active time at a timing of the first sidelink resource (e.g., the initial sidelink resource) among the one or more sidelink resources of the sidelink grant, the Tx UE may transmit a signal (prior to the timing) to instruct (and/or indicate to) the one or more Rx UEs to wake up (e.g., to be in active time and/or wake up mode at the timing). Alternatively and/or additionally, if the Tx UE determines (and/or considers and/or derives) that no Rx UE with DRX configuration is in wake up mode and/or in active time at a timing of the initial sidelink resource among the one or more sidelink resources of the sidelink grant, the Tx UE may perform a Logical Channel Prioritization (LCP) procedure and/or select a destination, of one or more destinations associated with the one or more Rx UEs, based on priorities of logical channels associated with the one or more destinations and/or based on one or more first Rx UEs, of the one or more Rx UEs, that are in active time and/or wake up mode during a second timing of the second sidelink resource. For example, the destination may be selected based on a determination that the destination is associated with a Rx UE that is in wake up mode and/or active time during the second timing of the second sidelink resource and/or that a logical channel associated with the destination has a highest priority among one or more priorities of one or more logical channels associated with one or more destinations having an active time and/or a wake up time during the second time of the second sidelink resource.

With respect to one or more embodiments herein, the one or more sidelink resources of the sidelink grant may be within a window (e.g., an indication window).

In some examples, a length of the window is 32 slots (in units of slots belonging to a sidelink resource pool).

In some examples, the window starts from the first sidelink resource (e.g., the initial sidelink resource in time domain) indicated by the sidelink grant.

With respect to one or more embodiments herein, when a UE is in wake up mode and/or is in active time (for sidelink), the UE monitors sidelink control channels (for SCI, for example). The UE may not monitor sidelink control channels when the UE is not in wake up mode and is not in active time (for sidelink).

In some examples, an active time of a UE is a time in which the UE is in active time and/or wake up mode (e.g., the UE monitors sidelink control channel during the active time of the UE).

In some examples, an active time of a destination corresponds to a time in which at least one device associated with the destination is in active time and/or wake up mode (e.g., at least one device associated with the destination monitors sidelink control channel during the active time of the destination).

In some examples, a DRX configuration (for sidelink) may indicate a length and/or periodicity of a DRX cycle and/or DRX period, and/or the DRX configuration (for sidelink) may indicate a length of Onduration timer.

A destination has an active time containing a timing may refer to and/or imply that at least one device (e.g., a UE) associated with the destination is in active time and/or is monitoring sidelink control channel at the timing.

One, some and/or all of the foregoing techniques and/or embodiments can be formed to a new embodiment.

In some examples, embodiments disclosed herein, such as embodiments described with respect to the first concept and the second concept, may be implemented independently and/or separately. Alternatively and/or additionally, a combination of embodiments described herein, such as embodiments described with respect to the first concept and/or the second concept, may be implemented. Alternatively and/or additionally, a combination of embodiments described herein, such as embodiments described with respect to the first concept and/or the second concept, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 8:
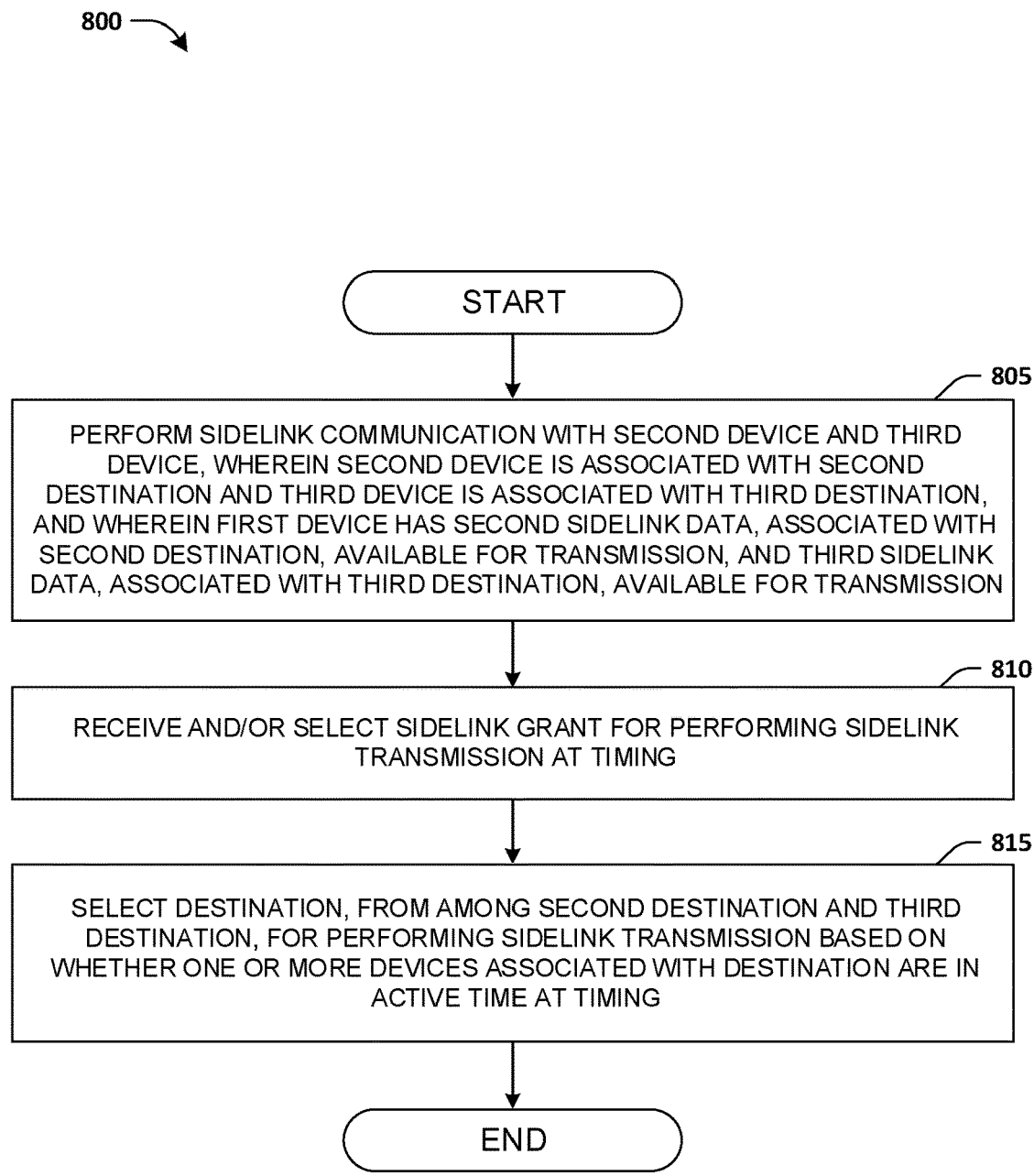
FIG. 8 is a flow chart according to one exemplary embodiment.

FIG. 8 is a flow chart 800 according to one exemplary embodiment from the perspective of a first device. In step 805, the first device performs sidelink communication with a second device and a third device, wherein the second device is associated with a second destination and the third device is associated with a third destination. The first device has a second sidelink data, associated with the second destination, available for transmission, and a third sidelink data, associated with the third destination, available for transmission. In step 810, the first device receives and/or selects a sidelink grant for performing a sidelink transmission at a timing. In step 815, the first device selects a destination, from among the second destination and the third destination, for performing the sidelink transmission based on whether one or more devices associated with the destination are in active time at the timing.

In one embodiment, the first device does not select the second destination if the second device is not in active time at the timing.

In one embodiment, the first device does not select the second destination if all devices (e.g., all Rx devices) associated with the second destination are not in active time at the timing.

In one embodiment, the first device selects the destination based on a determination that at least one device associated with the destination is in active time at the timing. For example, the first device may be configured to (and/or able to and/or allowed to) select the destination based on a determination that the destination is in active time at the timing.

In one embodiment, the second sidelink data is associated with a second logical channel with a priority higher than a priority of a third logical channel associated with the third sidelink data.

In one embodiment, the first device selects the third destination based on a determination that the second device is not in active time at the timing and the third device is in active time at the timing, regardless of whether the second sidelink data is associated with a priority higher than a priority associated with the third sidelink data.

In one embodiment, the first device selects the third destination based on a determination that all devices (e.g., all Rx devices) associated with the second destination are not in active time at the timing and at least one device (e.g., at least one Rx device) associated with the third destination is in active time at the timing, regardless of whether the second sidelink data is associated with a priority higher than a priority associated with the third sidelink data.

In one embodiment, if the first device selects the second destination for performing the sidelink transmission, the first device transmits the second sidelink data to one or more devices associated with the second destination via the sidelink transmission at the timing.

In one embodiment, if the first device selects the third destination for performing the sidelink transmission, the first device transmits the third sidelink data to one or more devices associated with the third destination via the sidelink transmission at the timing.

Referring back to FIGS. 3 and 4, in one exemplary embodiment of a first device, the device 300 includes a program code 312 stored in the memory 310. The CPU 308 could execute program code 312 to enable the first device (i) to perform sidelink communication with a second device and a third device, wherein the second device is associated with a second destination and the third device is associated with a third destination, wherein the first device has a second sidelink data associated with the second destination available for transmission and a third sidelink data associated with the third destination available for transmission, (ii) to receive and/or select a sidelink grant for performing a sidelink transmission at a timing, and (iii) to select a destination, from among the second destination and the third destination, for performing the sidelink transmission based on whether one or more devices associated with the destination are in active time at the timing. Furthermore, the CPU 308 can execute the program code 312 to perform one, some and/or all of the above-described actions and steps and/or others described herein.

Figure 9:
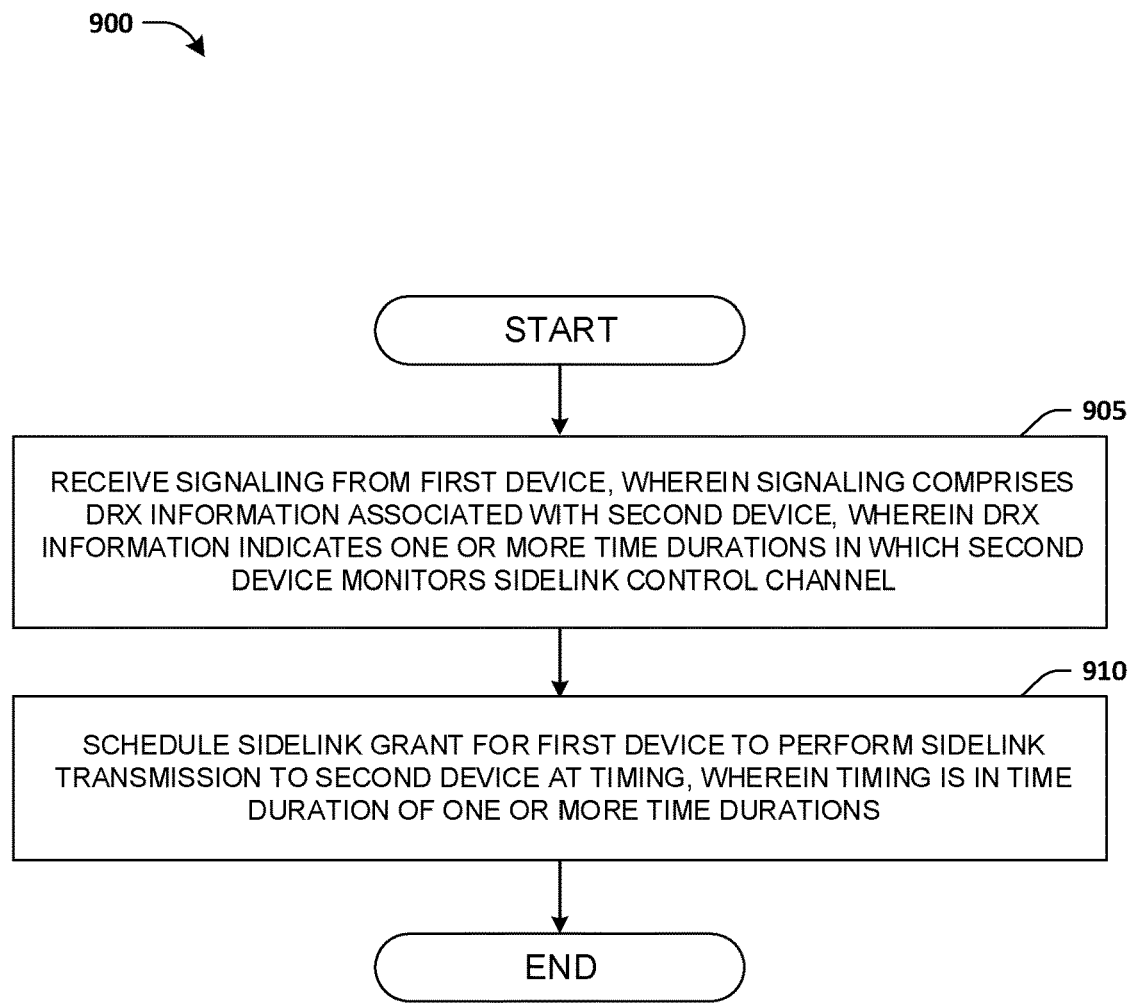
FIG. 9 is a flow chart according to one exemplary embodiment.

FIG. 9 is a flow chart 900 according to one exemplary embodiment from the perspective of a network. In step 905, the network receives a signaling from a first device, wherein the signaling comprises DRX information associated with a second device, wherein the DRX information indicates one or more time durations in which the second device monitors a sidelink control channel. In step 910, the network schedules a sidelink grant for the first device to perform a sidelink transmission to the second device at a timing, wherein the timing is in a time duration of the one or more time durations. In an example, the time duration of the one or more time durations corresponds an active time of the second device. In an example, the network may schedule the sidelink grant and/or the timing based on the DRX information such that the timing is within a time duration of the one or more time durations.

In one embodiment, the network does not schedule a sidelink grant for the first device to perform a sidelink transmission to the second device at a timing not in the at least one time duration.

In one embodiment, the signaling is a Radio Resource Control (RRC) signaling.

In one embodiment, the signaling comprises a MAC control element (CE).

Referring back to FIGS. 3 and 4, in one exemplary embodiment of a network, the device 300 includes a program code 312 stored in the memory 310. The CPU 308 could execute program code 312 to enable the network (i) to receive a signaling from a first device, wherein the signaling comprises DRX information associated with a second device, wherein the DRX information indicates one or more time durations in which the second device monitors a sidelink control channel, and (ii) to schedule a sidelink grant for the first device to perform a sidelink transmission to the second device at a timing, wherein the timing is in a time duration of the one or more time durations. Furthermore, the CPU 308 can execute the program code 312 to perform one, some and/or all of the above-described actions and steps and/or others described herein.

With respect to FIGS. 8-9, in one embodiment, the second device uses and/or performs DRX operation based on a RRC configuration.

In one embodiment, the third device uses and/or performs DRX operation based on a RRC configuration.

In one embodiment, the second device discontinuously monitors a sidelink control channel based on one or more configurations (e.g., one or more pre-configurations).

In one embodiment, the third device discontinuously monitors a sidelink control channel based on one or more configurations (e.g., one or more pre-configurations).

In one embodiment, an active time of the second device is a time in which the second device is in active time. In some examples, the second device monitors a sidelink control channel when the second device is in active time. Alternatively and/or additionally, the second device monitors a SCI when the second device is in active time.

In one embodiment, an active time of the third device is a time in which the third device is in active time. In some examples, the third device monitors a sidelink control channel when the third device is in active time. Alternatively and/or additionally, the third device monitors a SCI when the third device is in active time.

In one embodiment, the first device performs sidelink unicast communication, sidelink groupcast communication and/or sidelink broadcast transmission with the second device and/or the third device.

In one embodiment, the sidelink control channel is PSCCH.

In one embodiment, the first device establishes a first link (e.g., a PC5 link) with the second device, and a second link (e.g., a PC5 link) with the third device.

In one embodiment, the second destination is associated with a second destination identity and/or the third destination is associated with a third destination identity.

In one embodiment, the sidelink transmission is a new transmission of a TB.

Figure 10:
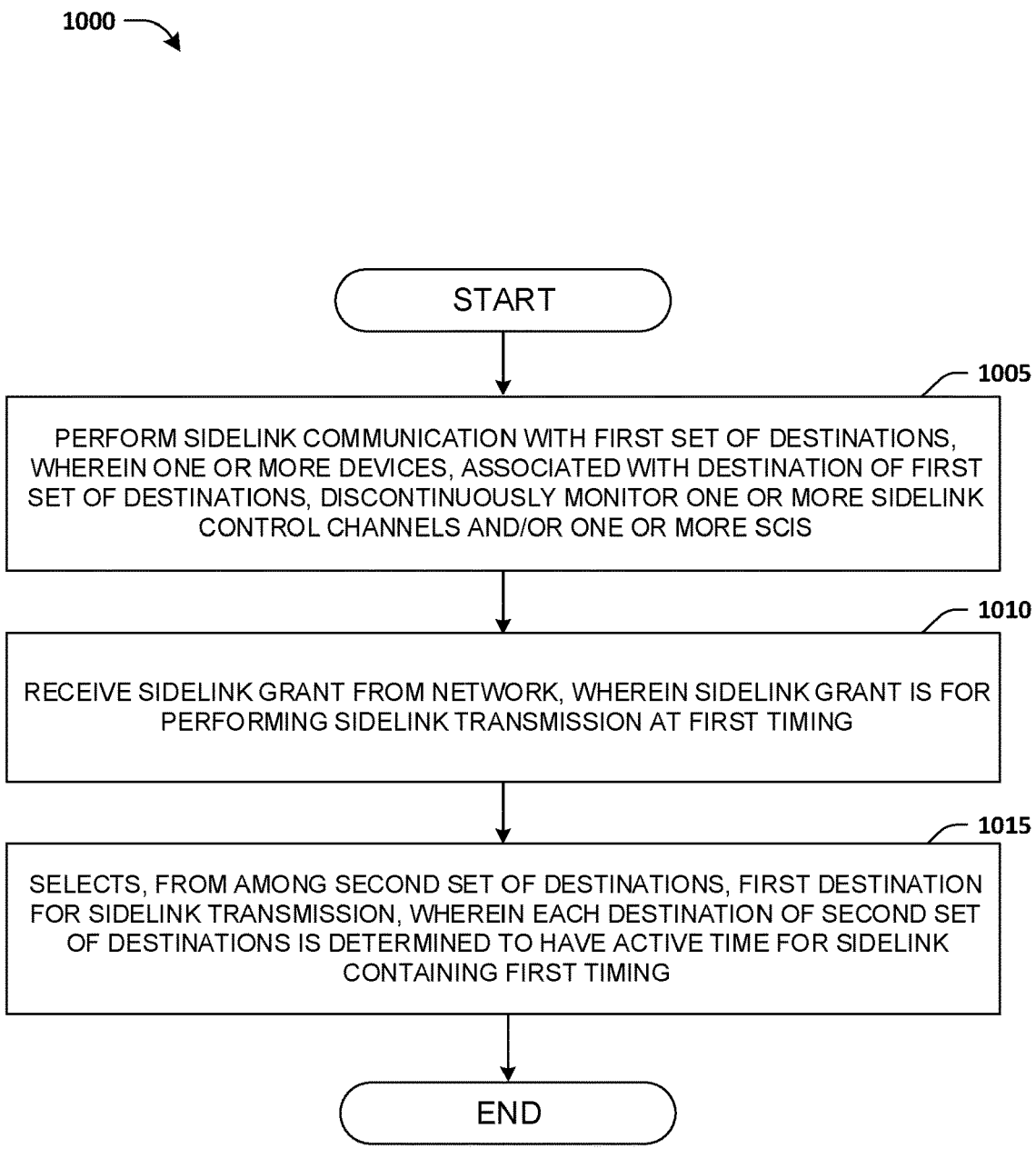
FIG. 10 is a flow chart according to one exemplary embodiment.

FIG. 10 is a flow chart 1000 according to one exemplary embodiment from the perspective of a first device. In step 1005, the first device performs sidelink communication with a first set of destinations (e.g., a first set of one or more destinations), wherein one or more devices, associated with a destination (e.g., one destination) of the first set of destinations, discontinuously monitor one or more sidelink control channels and/or one or more SCIs. In step 1010, the first device receives a sidelink grant from a network, wherein the sidelink grant is for performing a sidelink transmission at a first timing (and/or for performing one or more sidelink transmissions, at one or more timings, in addition to the sidelink transmission). In step 1015, the first device selects, from among a second set of destinations (e.g., a second set of one or more destinations), a first destination for the sidelink transmission, wherein each destination of the second set of destinations is determined to have an active time for sidelink containing the first timing.

In an example, a first active time of the first destination may contain the first timing and a second active time of a second destination of the second set of destinations may contain the first timing. The first active time may be different than the second active time.

In one embodiment, the first device identifies the second set of destinations, wherein each destination of the second set of destinations is determined to have an active time for sidelink containing the first timing. For example, the first device may determine that each destination of the second set of destinations is associated with one or more devices that are in active time for sidelink at the first timing.

For example, the first device may not select, for performing the sidelink transmission, a destination that does not have an active time containing the first timing (e.g., a destination that has an inactive time containing the first timing).

In one embodiment, the first device selects the first destination for the sidelink transmission based on a determination that a first priority, of a first logical channel associated with the first destination, is a highest priority among priorities of a set of logical channels associated with the second set of destinations (e.g., a logical channel of the set of logical channels is associated with a destination of the second set of destinations). For example, the first device selects the first destination for the sidelink transmission based on a determination that the first destination is associated with a logical channel with highest priority among logical channels associated with the second set of destinations.

In one embodiment, the first device selects a destination (e.g., the first destination) for the sidelink transmission based on a determination that the destination is associated with a logical channel with highest priority among logical channels associated with one or more destinations, of the first set of destinations, satisfying one or more first conditions comprising a first condition. The first condition may be satisfied by a destination if the destination has active time for sidelink containing the first timing. For example, Each destination of the one or more destinations satisfy the one or more first conditions, and thus, each destination of the one or more destinations has active time for sidelink containing the first timing.

In one embodiment, the receiving the sidelink grant for performing the sidelink transmission at the first timing is performed by receiving the sidelink grant that indicates at least a sidelink resource at the first timing. The first device performs the sidelink transmission on the sidelink resource.

In one embodiment, the second set of destinations is a subset of the first set of destinations.

In one embodiment, the second set of destinations comprises destinations, of the first set of destinations, that are each determined to have an active time for sidelink containing the first timing. For example, the second set of destinations may comprise all destinations, of the first set of destinations, that are each determined to have an active time for sidelink containing the first timing. For example, a destination that has an active time for sidelink containing the first timing corresponds to a destination that is associated with a Rx UE that is in active time at the first timing.

In one embodiment, the first device identifies the second set of destinations by identifying one or more destinations, of the first set of destinations, that each have an active time for sidelink containing the first timing, wherein the second set of destinations comprises the one or more destinations.

In one embodiment, the first device identifies, derives, and/or determines the second set of destinations based on which destination(s) of the first set of destinations is (identified, derived, and/or determined as being) in active time for sidelink at the first timing.

In one embodiment, during an active time for sidelink of a second destination of the second set of destinations, one or more second devices associated with the second destination monitor a second sidelink control channel and/or a second SCI.

In one embodiment, during an inactive time for sidelink of a third destination of the second set of destinations, one or more third devices associated with the third destination do not monitor a sidelink control channel (e.g., any sidelink control channel) and do not monitor a SCI (e.g., any SCI).

In one embodiment, the sidelink transmission is a new transmission of a TB.

Referring back to FIGS. 3 and 4, in one exemplary embodiment of a first device, the device 300 includes a program code 312 stored in the memory 310. The CPU 308 could execute program code 312 to enable the first device (i) to perform sidelink communication with a first set of destinations, wherein one or more devices, associated with a destination (e.g., one destination) of the first set of destinations, discontinuously monitor one or more sidelink control channels and/or one or more SCIs, (ii) to receive a sidelink grant from a network, wherein the sidelink grant is for performing a sidelink transmission at a first timing (and/or for performing one or more sidelink transmissions, at one or more timings, in addition to the sidelink transmission), and (iii) to select, from among a second set of destinations, a first destination for the sidelink transmission, wherein each destination of the second set of destinations is determined to have an active time for sidelink containing the first timing. Furthermore, the CPU 308 can execute the program code 312 to perform one, some and/or all of the above-described actions and steps and/or others described herein.

Figure 11:
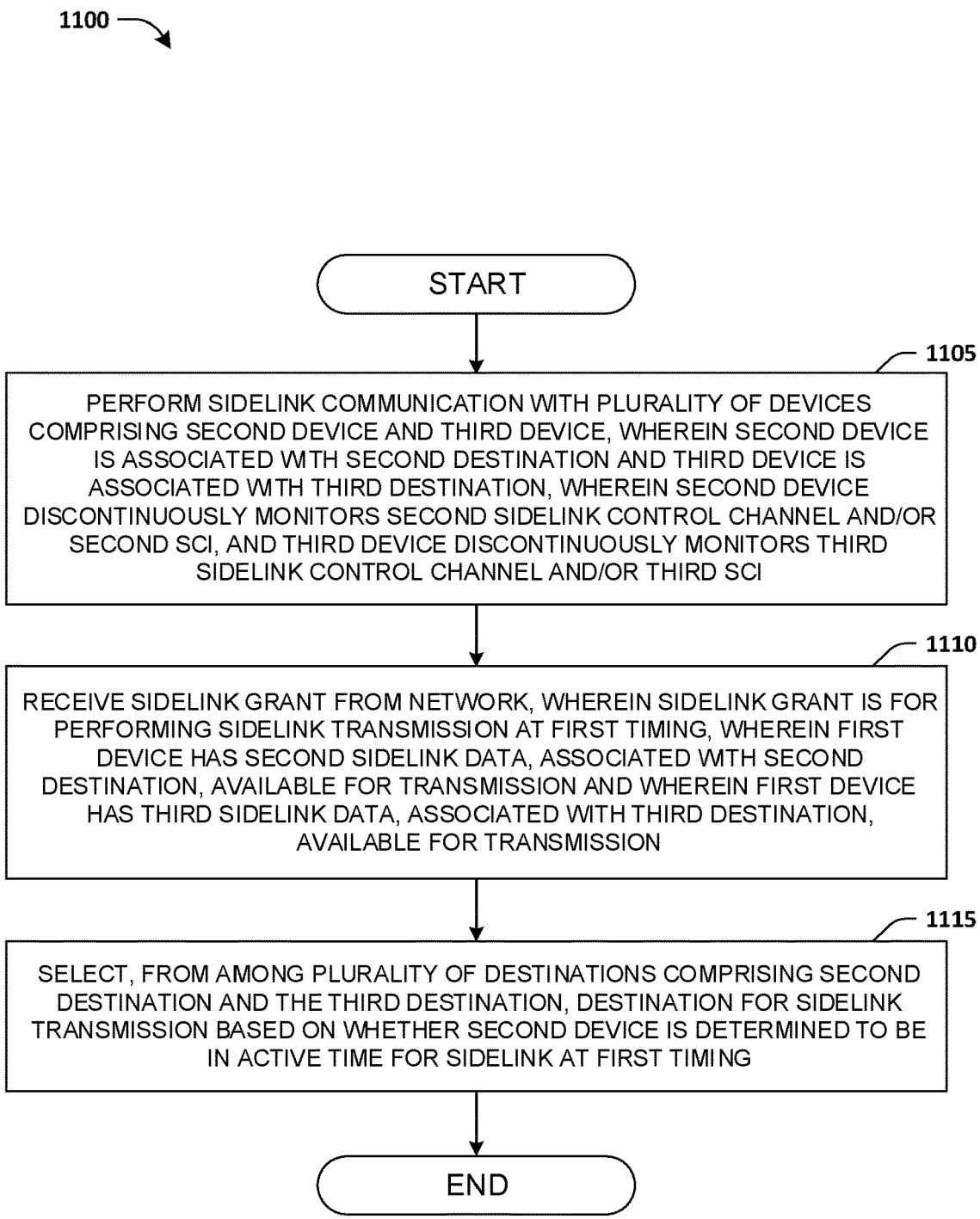
FIG. 11 is a flow chart according to one exemplary embodiment.

FIG. 11 is a flow chart 1100 according to one exemplary embodiment from the perspective of a first device. In step 1105, the first device performs sidelink communication with a plurality of devices comprising a second device and a third device, wherein the second device is associated with a second destination and the third device is associated with a third destination, the second device discontinuously monitors a second sidelink control channel and/or a second SCI, and the third device discontinuously monitors a third sidelink control channel and/or a third SCI. In some examples, the plurality of devices comprises one or more devices in addition to the second device and the third device. Alternatively and/or additionally, the plurality of devices may merely comprise the second device and the third device. In step 1110, the first device receives a sidelink grant from a network, wherein the sidelink grant is for performing a sidelink transmission at a first timing, wherein the first device has second sidelink data, associated with the second destination, available for transmission and wherein the first device has third sidelink data, associated with the third destination, available for transmission. In step 1115, the first device selects, from among a plurality of destinations comprising the second destination and the third destination, a destination for the sidelink transmission based on whether the second device is determined to be in active time for sidelink at the first timing. In some examples, the plurality of destinations comprises one or more destinations in addition to the second destination and the third destination. Alternatively and/or additionally, the plurality of destinations may merely comprise the second destination and the third destination.

In one embodiment, the first device selects the destination for the sidelink transmission based on whether the third device is determined to be in active time for sidelink at the first timing.

In one embodiment, the first device selects, for the sidelink transmission, a destination different than the second destination based on a determination that the second device is not in active time for sidelink at the first timing.

In one embodiment, the first device selects, for the sidelink transmission, a destination different than the second destination based on a determination that all devices associated with the second destination are not in active time for sidelink at the first timing.

In one embodiment, the first device selects, for the sidelink transmission, the destination based on a determination that at least one device associated with the destination is in active time for sidelink at the first timing. For example, the first device may be configured to (and/or able to and/or allowed to) select the second destination for the sidelink transmission if at least one device (such as the second device) associated with the second destination is in active time for sidelink at the first timing.

In one embodiment, the first device selects, for the sidelink transmission, the second destination based on a determination that the second device is in active time for sidelink at the first timing and that a second priority of a second logical channel associated with the second sidelink data is higher than a third priority of a third logical channel associated with the third sidelink data.

In one embodiment, the first device selects, for the sidelink transmission, the second destination based on a determination that all devices associated with the second destination are in active time for sidelink at the first timing and that the second priority of the second logical channel is higher than the third priority of the third logical channel.

In one embodiment, the first device selects, for the sidelink transmission, the second destination based on a determination that the third device is not in active time for sidelink at the first timing and the second device is in active time for sidelink at the first timing, regardless of whether a third priority associated with the third sidelink data is higher than a second priority associated with the second sidelink data. For example, if the third device is not in active time for sidelink at the first timing and the second device is in active time for sidelink at the first timing, the first device may select the second destination without considering whether the third priority is higher than the second priority. The third priority may be higher or lower than the second priority.

In one embodiment, the first device selects, for the sidelink transmission, the second destination based on a determination that all devices associated with the third destination are not in active time for sidelink at the first timing and that at least one device associated with the second destination is in active time at the first timing, regardless of whether the third priority is higher than the second priority. For example, if all devices associated with the third destination are not in active time for sidelink at the first timing and at least one device associated with the second destination is in active time at the first timing, the first device may select the second destination without considering whether the third priority is higher than the second priority. The third priority may be higher or lower than the second priority.

In one embodiment, the first device selects, for the sidelink transmission, the third destination based on a determination that the second device is not in active time for sidelink at the first timing and the third device is in active time for sidelink at the first timing, regardless of whether a second priority associated with the second sidelink data is higher than a third priority associated with the third sidelink data. For example, if the second device is not in active time for sidelink at the first timing and the third device is in active time for sidelink at the first timing, the first device may select the third destination without considering whether the second priority is higher than the third priority. The second priority may be higher or lower than the third priority.

In one embodiment, the first device selects, for the sidelink transmission, the third destination based on a determination that all devices associated with the second destination are not in active time for sidelink at the first timing and that at least one device associated with the third destination is in active time at the first timing, regardless of whether the second priority is higher than the third priority. For example, if all devices associated with the second destination are not in active time for sidelink at the first timing and at least one device associated with the third destination is in active time at the first timing, the first device may select the third destination without considering whether the second priority is higher than the third priority. The second priority may be higher or lower than the third priority.

In one embodiment, if the first device selects the second destination for the sidelink transmission, the first device performs the sidelink transmission at the first timing to transmit the second sidelink data to one or more second devices (comprising the second device, for example) associated with the second destination. For example, the sidelink transmission comprises transmitting, at the first timing, the second sidelink data to the one or more second devices.

In one embodiment, if the first device selects the third destination for the sidelink transmission, the first device performs the sidelink transmission at the first timing to transmit the third sidelink data to one or more third devices (comprising the third device, for example) associated with the third destination. For example, the sidelink transmission comprises transmitting, at the first timing, the third sidelink data to the one or more third devices.

In one embodiment, the receiving the sidelink grant for performing the sidelink transmission at the first timing is performed by receiving the sidelink grant that indicates at least a sidelink resource at the first timing. The first device performs the sidelink transmission on the sidelink resource.

In one embodiment, the second device discontinuously monitors the second sidelink control channel and/or the second SCI based on a second RRC configuration of the second device. The third device discontinuously monitors the third sidelink control channel and/or the third SCI based on a third RRC configuration of the third device.

In one embodiment, the second device discontinuously monitors the second sidelink control channel and/or the second SCI based on a second configuration of the second device. The third device discontinuously monitors the third sidelink control channel and/or the third SCI based on a third configuration of the third device. The second configuration may be a pre-configuration, such as a configuration with which the second device is configured (e.g., pre-configured) prior to the sidelink transmission. The third configuration may be a pre-configuration, such as a configuration with which the third device is configured (e.g., pre-configured) prior to the sidelink transmission.

In one embodiment, when the second device is in active time for sidelink, the second device monitors the second sidelink control channel and/or the second SCI.

In one embodiment, when the third device is in active time for sidelink, the third device monitors the third sidelink control channel and/or the third SCI.

In one embodiment, the second destination is associated with a second destination identity.

In one embodiment, the third destination is associated with a third destination identity.

In one embodiment, the sidelink transmission is a new transmission of a TB.

Referring back to FIGS. 3 and 4, in one exemplary embodiment of a first device, the device 300 includes a program code 312 stored in the memory 310. The CPU 308 could execute program code 312 to enable the first device (i) to perform sidelink communication with a plurality of devices comprising a second device and a third device, wherein the second device is associated with a second destination and the third device is associated with a third destination, the second device discontinuously monitors a second sidelink control channel and/or a second SCI, and the third device discontinuously monitors a third sidelink control channel and/or a third SCI, (ii) to receive a sidelink grant from a network, wherein the sidelink grant is for performing a sidelink transmission at a first timing, wherein the first device has second sidelink data, associated with the second destination, available for transmission and wherein the first device has third sidelink data, associated with the third destination, available for transmission, and (iii) to select, from among a plurality of destinations comprising the second destination and the third destination, a destination for the sidelink transmission based on whether the second device is determined to be in active time for sidelink at the first timing. Furthermore, the CPU 308 can execute the program code 312 to perform one, some and/or all of the above-described actions and steps and/or others described herein.

To enhance 3GPP specification for wireless communication in accordance with some embodiments herein, Enhancement 1 is provided herein. Enhancement 1 is reflective of implementation in accordance with some embodiments herein, and comprises an addition to a portion of Running CR for 3GPP 38.321 for NR Sidelink. The portion contains Section 5.x.1.4.1.2 of Running CR for 3GPP 38.321 for NR Sidelink. The portion, without the addition, is quoted below:

5.x.1.4.1.2 Selection of logical Channels

The MAC entity shall for each SCI corresponding to a new transmission:
> 1> select a Destination associated to one of unicast, groupcast and broadcast, having the logical channel with the highest priority, among the logical channels having data available for transmission;
> 1> select the logical channels for each SL grant that satisfy all the following condition:
>> 2> [configuredSLGrantTypelAllowed], if configured, is set to true in case the SL grant is a Configured Grant Type 1.

In Enhancement 1, an addition is made to the portion in accordance with some embodiments of the present disclosure. The addition provides that, for a new transmission, a destination is selected that has a logical channel having a highest priority among logical channels that have data available for transmission and that are associated with a Rx UE that is in active time at the timing of the new transmission. Without the addition of Enhancement 1, Section 5.x.1.4.1.2 of Running CR for 3GPP 38.321 for NR Sidelink provides that a destination is selected that has a logical channel having a highest priority among logical channels that have data available for transmission (e.g., whether the destination is associated with a Rx UE that is in active time at the timing of the new transmission is not considered), and thus, the selected destination may be associated with a Rx UE that is not in active time at the timing of the new transmission, leading to data loss and/or resource waste. However, in Enhancement 1, whether a destination is associated with a Rx UE that is in active time at the timing of the new transmission is considered when selecting the destination, and thus, the selected destination is associated with a Rx UE that is in active time at the timing of the new transmission. The addition in Enhancement 1 is in bold, and is preceded by the term "ADDITION STARTS:" and followed by the term "ADDITION ENDS" to distinguish the addition from what is originally included in Section 5.x.1.4.1.2 of Running CR for 3GPP 38.321 for NR Sidelink.

Enhancement 1:

5.x.1.4.1.2 Selection of Logical Channels

The MAC entity shall for each SCI corresponding to a new transmission:
> 1> select a Destination associated to one of unicast, groupcast and broadcast, having the logical channel with the highest priority, among the logical channels having data available for transmission ADDITION STARTS: and associated with a Rx UE that is in active time at the timing of the new transmission ADDITION ENDS;
> 1> select the logical channels for each SL grant that satisfy all the following condition:
>> 2> [configuredSLGrantTypelAllowed], if configured, is set to true in case the SL grant is a Configured Grant Type 1.

A communication device (e.g., a device, a sidelink device, a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 8-11. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 8-11, and/or one, some and/or all of the above-described actions and steps and/or others described herein.

It may be appreciated that applying one or more of the techniques presented herein may result in one or more benefits including, but not limited to, increased efficiency of communication between devices (e.g., a first device and a second device performing sidelink communication). The increased efficiency may be a result of enabling the first device to select a destination, from among a set of destinations, for performing a sidelink transmission based on whether destinations of the set of destinations and/or devices associated with the destinations are in active time at a timing of the sidelink transmission. Accordingly, the first device may select a destination associated with a second device that is in active time at the timing of the sidelink transmission, and as a result, the second device may receive the sidelink transmission while avoiding data loss and resource waste.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device, the method comprising:
performing sidelink communication with a first set of destinations, wherein each destination corresponds to a group of devices;
receiving a sidelink grant from a network, wherein the sidelink grant is for performing a new sidelink transmission of a Transport Block (TB) at a first timing; and
selecting, from among the first set of destinations that each correspond to a group of devices, a first destination for performing the new sidelink transmission of the TB at the first timing based on (i) a first priority of a first logical channel of the first destination and (ii) an active time for sidelink of the first destination, wherein the first device has sidelink data, from logical channels associated with the first set of destinations, available for transmission, and wherein the active time for sidelink is a time for one or more devices, associated with the first destination, to monitor at least one of one or more sidelink control channels or one or more sidelink control informations (SCIs).

2. The method of claim 1, wherein:
the selecting the first destination for performing the new sidelink transmission of the TB at the first timing is performed based on a determination that the first priority, of the first logical channel of the first destination, is a highest priority among priorities of a set of logical channels having data available for transmission associated with a second set of destinations, wherein each destination of the second set of destinations is determined to have an active time for sidelink containing the first timing.

3. The method of claim 2, wherein at least one of:
the second set of destinations is a subset of the first set of destinations;
the second set of destinations comprises destinations, of the first set of destinations, that are each determined to have an active time for sidelink containing the first timing; or
the method comprises identifying the second set of destinations by identifying one or more destinations, of the first set of destinations, that each have an active time for sidelink containing the first timing, wherein the second set of destinations comprises the one or more destinations.

4. The method of claim 1, wherein at least one of:
during an active time for sidelink of a destination, one or more devices associated with the destination monitor SCI; or
during an inactive time for sidelink of a destination, one or more devices associated with the destination do not monitor SCI.

5. The method of claim 1, comprising:
performing sidelink communication with a second set of destinations;
receiving a second sidelink grant from the network, wherein the second sidelink grant is for performing a second sidelink transmission of a second TB at a second timing; and
selecting, from among the second set of destinations, a second destination for performing the second sidelink transmission of the second TB at the second timing based on a second priority of a second logical channel of the second destination and an active time for sidelink of the second destination, wherein the second destination is determined to be in the active time for sidelink of the second destination at the second timing and the first device has second sidelink data, from logical channels associated with the second set of destinations, available for transmission.

6. A first device, the first device comprising:
a control circuit;
a processor installed in the control circuit; and
a memory installed in the control circuit and operatively coupled to the processor, wherein the processor is configured to execute a program code stored in the memory to perform operations, the operations comprising:
performing sidelink communication with a first set of destinations, wherein each destination corresponds to a group of devices;
receiving a sidelink grant from a network, wherein the sidelink grant is for performing a new sidelink transmission of a Transport Block (TB) at a first timing; and
selecting, from among the first set of destinations that each correspond to a group of devices, a first destination for performing the new sidelink transmission of the TB at the first timing based on (i) a first priority of a first logical channel of the first destination and (ii) an active time for sidelink of the first destination, wherein the first device has sidelink data, from logical channels associated with the first set of destinations, available for transmission, and wherein the active time for sidelink is a time for one or more devices, associated with the first destination, to monitor at least one of one or more sidelink control channels or one or more sidelink control informations (SCIs).

7. The first device of claim 6, wherein:
the selecting the first destination for performing the new sidelink transmission of the TB at the first timing is performed based on a determination that the first priority, of the first logical channel associated with the first destination, is a highest priority among priorities of a set of logical channels having data available for transmission associated with a second set of destinations, wherein each destination of the second set of destinations is determined to have an active time for sidelink containing the first timing.

8. A non-transitory computer-readable medium comprising processor-executable instructions that when executed by a first device cause performance of operations, the operations comprising:
performing sidelink communication with a first set of destinations, wherein each destination corresponds to a group of devices;
receiving a sidelink grant from a network, wherein the sidelink grant is for performing a new sidelink transmission of a Transport Block (TB) at a first timing; and
selecting, from among the first set of destinations that each correspond to a group of devices, a first destination for performing the new sidelink transmission of the TB at the first timing based on (i) a first priority of a first logical channel of the first destination and (ii) an active time for sidelink of the first destination, wherein the first device has sidelink data, from logical channels associated with the first set of destinations, available for transmission, and wherein the active time for sidelink is a time for one or more devices, associated with the first destination, to monitor at least one of one or more sidelink control channels or one or more sidelink control informations (SCIs).

9. The non-transitory computer-readable medium of claim 8, wherein:
the selecting the first destination for performing the new sidelink transmission of the TB at the first timing is performed based on a determination that the first priority, of the first logical channel of the first destination, is a highest priority among priorities of a set of logical channels having data available for transmission associated with a second set of destinations, wherein each destination of the second set of destinations is determined to have an active time for sidelink containing the first timing.

10. The non-transitory computer-readable medium of claim 9, wherein at least one of:
the second set of destinations is a subset of the first set of destinations;
the second set of destinations comprises destinations, of the first set of destinations, that are each determined to have an active time for sidelink containing the first timing; or
the operations comprise identifying the second set of destinations by identifying one or more destinations, of the first set of destinations, that each have an active time for sidelink containing the first timing, wherein the second set of destinations comprises the one or more destinations.

11. The non-transitory computer-readable medium of claim 8, wherein at least one of:
during an active time for sidelink of a destination, one or more devices associated with the destination monitor SCI; or
during an inactive time for sidelink of a destination, one or more devices associated with the destination do not monitor SCI.

12. The non-transitory computer-readable medium of claim 8, the operations comprising:
performing sidelink communication with a second set of destinations;
receiving a second sidelink grant from the network, wherein the second sidelink grant is for performing a second sidelink transmission of a second TB at a second timing; and
selecting, from among the second set of destinations, a second destination for performing the second sidelink transmission of the second TB at the second timing based on a second priority of a second logical channel of the second destination and an active time for sidelink of the second destination, wherein the second destination is determined to be in the active time for sidelink of the second destination at the second timing and the first device has second sidelink data, from logical channels associated with the second set of destinations, available for transmission.

* * * * *